(12) United States Patent
Lu et al.

(10) Patent No.: US 9,758,628 B2
(45) Date of Patent: Sep. 12, 2017

(54) METHOD OF FABRICATING CARBON NANOTUBE SHEET SCROLLED FIBER REINFORCED POLYMER COMPOSITES AND COMPOSITIONS AND USES THEREOF

(71) Applicant: THE BOARD OF REGENTS, THE UNIVERSITY OF TEXAS SYSTEM, Austin, TX (US)

(72) Inventors: Hongbing Lu, Plano, TX (US); Ray H. Baughman, Dallas, TX (US); Mohammad H. Haque, Richardson, TX (US); Shaoli D. Fang, Richardson, TX (US)

(73) Assignee: The Board of Regents, The University of Texas System, Austin, TX (US)

(*) Notice: Subject to any disclaimer, the term of this patent is extended or adjusted under 35 U.S.C. 154(b) by 0 days.

(21) Appl. No.: 14/775,940

(22) PCT Filed: Mar. 14, 2014

(86) PCT No.: PCT/US2014/027188
§ 371 (c)(1),
(2) Date: Sep. 14, 2015

(87) PCT Pub. No.: WO2014/197078
PCT Pub. Date: Dec. 11, 2014

(65) Prior Publication Data
US 2016/0024262 A1 Jan. 28, 2016

Related U.S. Application Data

(60) Provisional application No. 61/784,247, filed on Mar. 14, 2013.

(51) Int. Cl.
| | |
|---|---|
| *C08J 5/04* | (2006.01) |
| *C08J 5/06* | (2006.01) |
| *C08J 5/24* | (2006.01) |
| *D02G 3/36* | (2006.01) |
| *B29C 70/02* | (2006.01) |

(52) U.S. Cl.
CPC .............. *C08J 5/06* (2013.01); *B29C 70/021* (2013.01); *C08J 5/042* (2013.01); *C08J 5/24* (2013.01); *D02G 3/36* (2013.01); *C08J 2363/00* (2013.01); *D10B 2101/122* (2013.01)

(58) Field of Classification Search
CPC .................................. C08J 5/042; D02G 3/36
USPC .......................................... 523/222; 156/172
See application file for complete search history.

(56) References Cited

U.S. PATENT DOCUMENTS 6,033,779 A   3/2000  Andrews

OTHER PUBLICATIONS

[0084] "Aliev 2009": Aliev AE, Oh J, Kozlov ME, Kuznetsov AA, Fang S, Fonseca AF, Ovalle R, Lima MD, Haque MH, Gartstein YN, Zhang M, Zakhidov AA, Baughman RH. Giant-Stroke, Superelastic Carbon Nanotube Aerogel Muscles. Science 2009;323(5921):1575-1578.

[0085] "Assael 2009": Assael MJ, Antoniadis KD, Metaxa IN. Measurements on the Enhancement of the Thermal Conductivity of an Epoxy Resin when Reinforced with Glass Fiber and Carbon Multiwalled Nanotubes. Journal of Chemical & Engineering Data 2009;54(9):2365-2370.

[0086] "Barber 2003": Barber AH, Cohen SR, Wagner HD. Measurement of carbon nanotube-polymer interfacial strength. Applied Physics Letters 2003;82(23):4140-4142.

[0087] "Barber 2006": Barber A, Cohen S, Eitan A, Schadler L, Wagner H. Fracture Transitions at a Carbon-Nanotube/Polymer Interface. Advanced Materials 2006;18(1):83-87.

[0088] "Bekyarova 2007 I": Bekyarova E, Thostenson ET, Yu A, Kim H, Gao J, Tang J, Hahn HT, Chou TW, Itkis ME, Haddon RC. Multiscale Carbon Nanotube?Carbon FiberReinforcement for Advanced Epoxy Composites. Langmuir 2007; 23(7):3970-3974.

[0089] "Bekyarova 2007 II": Bekyarova E, Thostenson ET, Yu A, Itkis ME, Fakhrutdinov D, Chou TW, Haddon RC. Functionalized Single-Walled Carbon Nanotubes for Carbon Fiber?Epoxy Composites. The Journal of Physical Chemistry C 2007;111(48):17865-17871.

[0090] Che 2009: Che J, Yuan W, Jiang G, Dai J, Lim SY, Chan-Park MB. Epoxy Composite Fibers Reinforced with Aligned Single-Walled Carbon Nanotubes Functionalized with Generation 0?2 Dendritic Poly(amidoamine). Chemistry of Materials 2009;21(8):1471-1479.

[0091] "Cheng 2010": Cheng Q, Wang B, Zhang C, Liang Z. Functionalized Carbon-Nanotube Sheet/Bismaleimide Nanocomposites: Mechanical and Electrical Performance Beyond Carbon-Fiber Composites. Small 2010;6(6):763-767.

[0092] "Desaeger 1993": Desaeger M, Verpoest I. On the use of the micro-indentation test technique to measure the 5 interfacial shear strength of fibre-reinforced polymer composites. Composites Science and Technology 1993;48 (1-4):215-226.

[0093] "Ding 2003": Ding W, Eitan A, Fisher FT, Chen , Dikin DA, Andrews R, Brinson LC, Schadler LS, Ruoff RS. Direct Observation of Polymer Sheathing in Carbon Nanotube?Polycarbonate Composites. Nano Letters 2003;3 (11)1593-1597.

[0094] "Fan 2008": Fan Z, Santare MH, Advani SG. Interlaminar shear strength of glass fiber reinforced epoxy composites enhanced with multi-walled carbon nanotubes. Composites Part A: Applied Science and Manufacturing 2008;39(3):540-554.

(Continued)

*Primary Examiner* — Edward Cain
(74) *Attorney, Agent, or Firm* — Dickinson Wright PLLC; Ross Spencer Garsson

(57) ABSTRACT

A novel method of fabricating carbon nanotube sheet scrolled fiber and fiber tows (carbon, graphite, glass, natural polymer, synthetic polymer, metallic, silicon carbide, Kevlar, etc.) in composites with improved interfacial shear strength, compressive strength, yield strength, stiffness and toughness has been reported. Single or multiple layers of carbon nanotube sheet, with a bias/wrapping angle of 0° and 90°, has been scrolled around single fiber and fibers tows to improve the above mentioned mechanical properties of the matrix surrounding the fiber. Other common methods of growing CNTs directly on the fibers actually damage the fiber surface during the required precursor deposition and CNTs growth process. This demonstrated solid-state method overcomes such known problems. The CNTs sheet scrolled fiber is embedded into the polymer matrix exhibits significant (80%) increase in interfacial shear strength, compressive strength and toughness.

30 Claims, 16 Drawing Sheets

(56) References Cited

OTHER PUBLICATIONS

[0095] "Ganesay 2011": Ganesan Y, Peng C, Lu Y, Loya PE, Moloney P, Barrera E, Yakobson BI, Tour JM, Ballarini R, Lou J. Interface Toughness of Carbon Nanotube Reinforced 15 Epoxy Composites. ACS Applied Materials & Interfaces 2011;3(2)129-134.
[0096] "Godara 2009": Godara A, Mezzo L, Luizi F, Warner A, Lomov SV, van Vuure AW, Gorbatikh L, Moldenaers P, Verpoest I. Influence of carbon nanotube reinforcement on the processing and the mechanical behaviour of carbon fiber/epoxy composites. Carbon 2009;47(12)2914-2923.
[0097] "Godara 2010": Godara A, Gorbatikh L, Kalinka G, Warner A, Rochez O, Mezzo L, Luizi F, van Vuure AW, Lomov SV, Verpoest I. Interfacial shear strength of a glass fiber/epoxy bonding in composites modified with carbon nanotubes. Composites Science and Technology 2010;70(9):1346-1352.
[0098] "He 2010": He H, Wang J, Li K, Wang J, Gu J. Mixed resin and carbon fibres 25 surface treatment for preparation of carbon fibres composites with good interfacial bonding strength. Materials & Design 2010;31 (10):4631-4637.
[0099] "Huang 1996": Huang Y, Young RJ. Interfacial micromechanics in thermoplastic and thermosetting matrix carbon fibre composites. Composites Part A: Applied Science and Manufacturing 1996;27(10):973-980.
[00100] "Kotaki 2009": Kotaki M, Wang K, Toh ML, Chen L, Wong SY, He C. Electrically Conductive Epoxy/ClayNapor Grown Carbon Fiber Hybrids. Macromolecules 2009;39(3):908-911.
[00101] "Li 2008": Li J. Interfacial studies on the O3 modified carbon fiber-reinforced polyamide 6 composites. Applied Surface Science 2008;255(5, Part 2):2822-2824.
[00103] "Ma 2009": Ma W, Liu L, Zhang Z, Yang R, Liu G, Zhang T, An X, Yi X, Ren Y, Niu Z, Li J, Dong H, Zhou W, Nayan PM, Xie S. High-Strength Composite Fibers: Realizing True Potential of Carbon Nanotubes in Polymer Matrix through Continuous Reticulate Architecture and Molecular Level Couplings. Nano Letters 2009;9(8):2855-2861.
[00104] "Manoharan 2009": Manoharan MP, Sharma A, Desai AV, Haque MA, Bakis CE, Wang KW. The interfacial strength of carbon nanofiber epoxy composite using single fiber pullout experiments. Nanotechnology 2009;20 (29):295701.
[00106] "Mei 2010": Mei L, He X, Li Y, Wang R, Wang C, Peng Q. Grafting carbon nanotubes onto carbon fiber by use of dendrimers. Materials Letters 2010;64(22):2505-2508.
[00107] "Moon 1992": Moon CK, Lee J, Cho HH, Kim KS. Effect of diameter and surface treatment of fiber on interfacial shear strength in glass fiber/epoxy and HDPE. Journal of Applied Polymer Science 1992;45(3):443-450.
[00108] "Özden-Yenigün 2012": Özden-Yenigün E, Mencelo?lu YZ, Papila M.MWCNTs/P(St-co-GMA) Composite Nanofibers of Engineered Interface Chemistry for Epoxy 20 Matrix Nanocomposites. ACS Applied Materials & Interfaces 2012;4(2):777-784.
[00109] "Qian 2010 I": Qian H, Bismarck A, Greenhalgh ES, Shaffer MSP. Carbon nanotube grafted carbon fibres: A study of wetting and fibre fragmentation. Composites Part A: Applied Science and Manufacturing 2010;41 (9)1107-1114.
[00110] "Quin 2010 II": Qian H, Bismarck A, Greenhalgh ES, Shaffer MSP. Carbon nanotube grafted silica fibres: Characterising the interface at the single fibre level. Composites Science and Technology 2010;70(2):393-399.
[00111] "Rubi 2011": Rubi YM, Ashrafi B, Guan J, Kingston C, Johnston A, Simard B, Mirjalili V, Hubert P, Deng L, Young RJ. Toughening of Epoxy Matrices with Reduced Single-Walled Carbon Nanotubes. ACS Applied Materials & Interfaces 2011;3(7)2309-2317.
[00112] "Sager 2009": Sager RJ, Klein PJ, Lagoudas DC, Zhang Q, Liu J, Dai L, Baur JW. Effect of carbon nanotubes on the interfacial shear strength of T650 carbon fiber in an epoxy matrix. Composites Science and Technology 2009;69 (7-8):898-904.
[00113] "Sharma 2011": Sharma SP, Lakkad SC. Effect of CNTs growth on carbon fibers on the tensile strength of CNTs grown carbon fiber-reinforced polymer matrix composites. Composites Part A: Applied Science and Manufacturing 2011;42(1):8-15.
[00114] "Sui 2009": Sui X, Wagner HD. Tough Nanocomposites: The Role of Carbon Nanotube Type. Nano Letters 2009;9(4)1423-1426.
[00115] "Swadener 1999": Swadener JG, Liechti KM, Lozanne Ald. The intrinsic toughness and adhesion mechanisms of a glass/epoxy interface. Journal of the Mechanics and Physics of Solids 1999;47(2):223-258.
[00116] "Tezcan 2008": Tezcan J, Ozcan S, Gurung B, Filip P. Measurement and analytical validation of interfacial bond strength of PAN-fiber-reinforced carbon matrix composites. Journal of Materials Science 2008;43(5):1612-1618.
[00117] "Thostenson 2002": Thostenson ET, Li WZ, Wang DZ, Ren ZF, Chou TW. Carbon nanotube/carbon fiber hybrid multiscale composites. Journal of Applied Physics 2002;91(9):6034-6037.
[00118] "Tseng 2007": Tseng CH, Wang CC, Chen CY. Functionalizing Carbon Nanotubes by Plasma Modification for the Preparation of Covalent-Integrated Epoxy Composites. Chemistry of Materials 2007:19(2):308-315.
[00119] "Tsotsis 2009": Tsotsis TK. Interlayer toughening of composite materials. Polymer Composites 2009;30 (1):70-86.
[00120] "Ureñia 2005": Ureñia A, Rams J, Escalera MD, Sanchez M. Characterization of interfacial mechanical properties in carbon fiber/aluminium matrix composites by the nanoindentation technique. Composites Science and Technology 2005;65(13):2025-2038.
[00121] "Zeng 2010": Zeng Y, Ci C, B.J., Vajtai R, Ajayan PM. Design and Reinforcement: Vertically Aligned Carbon Vanotube-Based Sandwich Composites. ACS Nano 2010;4(11):6798-6804.
[00122] "F Zhang 2009": Zhang F, Wang R, He X, Wang C, Ren L. Interfacial shearing strength and reinforcing mechanisms of an epoxy composite reinforced using a carbon nanotube/carbon fiber hybrid. Journal of Materials Science 2009;44(13):3574-3577.
[00123] "Zhang 2005": Zhang M, Fang S, Zakhidov AA, Lee SB, Aliev AE, Williams CD, Atkinson KR, Baughman RH. Strong, Transparent, Multifunctional, Carbon Nanotube Sheets. Science 2005;309(5738):1215-1219.
[00124] "Q Zhang 2009": Zhang Q, Liu J, Sager R, Dai L, Baur J. Hierarchical composites of carbon nanotubes on carbon fiber: Influence of growth condition on fiber tensile properties. Composites Science and Technology 2009;69(5):594-601.
[00125] "Zhao 2010": Zhao F, Huang Y. Improved interfacial properties of carbon fiber/epoxy composites through grafting polyhedral oligomeric silsesquioxane on carbon fiber surface. Materials Letters 2010;64(24):2742-2744.
[00126] "Zhong 2003": Zhong W, Pan N. A Computer Simulation of Single Fiber Pull Out Process in a Composite. Journal of Composite Materials 2003;37(21):1951-1969.
[00127] "Zhu 2003": Zhu J, Kim JD, Peng H, Margrave JL, Khabashesku VN, Barrera EV. Improving the Dispersion and Integration of Single-Walled Carbon Nanotubes in Epoxy Composites through Functionalization. Nano Letters 2003;3(8):1107-1113.
[00128] "Zhu 2007": Zhu J, Imam A, Crane R, Lozano K, Khabashesku VN, Barrera EV. Processing a glass fiberreinforced vinyl ester composite with nanotube enhancement of interlaminar shear strength. Composites Science and Technology 2007;67(7-8):1509-1517.
[00129] "Zhu 2012": Zhu Y, Bakis CE, Adair JH. Effects of carbon nanofiller functionalization and distribution on interlaminar fracture toughness of multi-scale reinforced polymer composites. Carbon 2012;50(3):1316-1331.
[00130] "Zu 2012": Zu M, Li Q, Zhu Y, Dey M, Wang G, Lu W, Deitzel JM, Gillespie Jr. JW, Byun J, Chou T. The effective interfacial shear strength of carbon nanotube fibers in an epoxy matrix characterized by a microdroplet test. Carbon 2012;50(3):1271-1279.

(56) References Cited

OTHER PUBLICATIONS

[00131] "Schoeppner 2007": Schoeppner GA, Tandon GP, Ripberger ER. Anisotropic oxidation and weight loss in PMR-15 composites. Composites Part A: Applied Science and Manufacturing 2007;38(3):890-904.
Officer Rossella Pittorru; International Search Report and Written Opinion, date of mailing Jan. 13, 2015; International application No. PCT/US2014/027188; 13 pages.
A. H. Barber et al: "Fracture Transitions at a Carbon-Nanotube/Polymer Interface", Advanced Materials, vol. 18, No. 1, Jan. 5, 2006 (Jan. 5. 2006), pp. 83-87, XP055155772.
Bekyarova E; Thostenson ET; Yu A; Kim H; Gao J; Tang J; Hahn HT; Chou TW; Itkis ME; Haddon RC: "Multiscale Carbon Nanotube-Carbon Fiber Reinforcement for Advanced Epoxy Composites", Langmuir, vol. 23, No. 7, 2007, pp. 3970-3974.
Harald F. Krug et al: "Nanopartikel", ROM PP Online, Version 3.37, Jun. 1, 2011 (Jun. 1, 2011 ), pp. 1-5, XP055092623.

METHOD OF FABRICATING CARBON NANOTUBE SHEET SCROLLED FIBER REINFORCED POLYMER COMPOSITES AND COMPOSITIONS AND USES THEREOF

CROSS-REFERENCE TO RELATED PATENT APPLICATIONS

This application is the 35 U.S.C. §371 national application of International Patent Application No. PCT/US14/27188 entitled "Method Of Fabricating Carbon Nanotube Sheet Scrolled Fiber Reinforced Polymer Composites And Compositions And Uses Thereof" filed on Mar. 14, 2014, which claims priority to U.S. Patent Appl. Ser. No. 61/784,247, filed on Mar. 14, 2013, entitled "Method Of Fabricating Carbon Nanotube Sheet Scrolled Fiber Reinforced Polymer Composites And Compositions And Uses Thereof," which patent application is commonly owned by the owner of the present invention. This patent application is hereby incorporated by reference in its entirety for all purposes. Both of these patent applications are commonly owned by the owner of the present invention.

GOVERNMENT INTEREST

This invention was made with government support under Grant No. FA9550-09-1-0527, FA9550-07-1-0579, and MURI Grant R17535 awarded by the Air Force Office of Scientific Research. The government has certain rights in the invention.

FIELD OF INVENTION

Improved performance polymer composites are provided by steps that include the wrapping of single carbon nanotube sheet, or multiple carbon nanotube (CNT) sheets about mechanically reinforcing fibers or fiber tows at a bias angle (in the case of wrapping with a single CNT sheet) or multiple bias angles (in the case of wrapping with multiple CNT sheets) between 0° to 90°. Wrapping is sufficiently high compared with the wrapped diameter so that more than one complete turn of wrapping of component individual nanotubes or individual nanotube bundles occurs. Polymer infiltration couples the strength and modulus of the nanotubes or nanotube bundles with that of the polymer matrix so that the fiber or fiber tow interface with the polymer matrix is strengthened, and improved mechanical properties (modulus, yield strength of CNT doped matrix surrounding a wrapped fiber or fiber tow, compressive strength) of the composite result.

BACKGROUND OF INVENTION

Recent increase in the use of fiber (or fiber tow) reinforced polymer matrix composite in aerospace, automotive, wind energy turbine blades, offshore drilling, sports equipment and other structures has motivated the development of new composites having increased strength and increased specific strength (strength per unit mass of composites). Composites fail in three different modes: matrix cracking, fiber fracture, and debonding at the interface. Load transfer has to be by way of the interface between fibers and matrix. Enhancing matrix stiffness and the strength of the matrix surrounding a fiber, and increasing the fiber/matrix interfacial strength will increase the stiffness and strength of the overall composites.

Load transfer has to take place through the interface between the fiber and polymer matrix, and the matrix is responsible for carrying the shear loads. The stiffness and transverse strength of fiber-reinforced composites depends on the mechanical behavior at the interface with a thickness approximately 100 nm or less. Swadener et al. determined that the failure or the delamination of a glass fiber occurs in the matrix 3 nm away from the fiber surface. [Swadener 1999]. Similar behavior has also been observed in single walled carbon nanotube (SWNT) nanocomposites. Ding et al. observed that a few nanometers of polycarbonate remains wrapped around a SWNT when the SWNT is pulled out of the polycarbonate matrix in fracture. [Ding 2003]. In order to increase the strength of composites, it is critical to improve the interfacial mechanical properties through modification of the polymer matrix, fibers or the interface.

Huang et al. has reported the interfacial micromechanics of carbon fibers in thermoplastic by determining the distribution of interfacial shear stress along fibers in single-fiber model composites using Raman spectroscopy. [Huang 1996]. The variations of fiber strain with position along the fiber in these composites are almost linear, indicating that stress transfer from matrix to fiber in the system is predominantly by frictional shear. It was found that the maximum values of interfacial shear strength for the polymethyl methacrylate (PMMA) and polycarbonate (PC) model composites are much lower than the value obtained for the same fibers in a thermosetting epoxy resin matrix. These low values of interfacial shear stress in thermoplastic systems can be explained by the lack of chemical bonding between the fiber and matrices, and possibly the effect of residual solvent. The interfacial adhesion in the systems stems primarily from mechanical interlocking, which can be enhanced by preparing the composites at higher temperatures. It is shown for PMMA that the maximum interfacial shear stress correlates very well with the radial pressure on the fiber as a result of thermal mismatch between the fiber and matrix.

In recent years, considerable effort has been made to enhance interfacial shear strength using CNTs grafted onto glass or carbon fibers to increase the interfacial shear strength (IFSS) [Mei 2010; Thostenson 2002; Qian 2010 I; Qian 2010 II; F Zhang 2009; Q Zhang 2009; Zeng 2010; Zhao 2010]. Besides nanotubes, grafting polyhedral oligomeric silsesquioxanes (POSS), an emerging new chemical technology for nano-reinforced organic-inorganic hybrids, has been demonstrated by Zhao et al. [Zhao 2010] and a 61% increase in Interfacial Shear Strength (IFSS) is claimed. Sager et al. showed improvement in interfacial shear strength with CNTs coated carbon fiber embedded in epoxy matrix by a single fiber fragmentation method. [Sager 2009]. Two configurations have been investigated: carbon fiber having radially (with 11% increase in IFSS) and randomly (with 71% increase IFSS) aligned multiwalled nanotube (MWNTs) embedded in epoxy. The use of randomly oriented MWNTs is observed to give higher interfacial shear strength due to a potentially higher percentage of MWNTs aligned with the ±45° principal stress directions under pure shear loading. However, they have reported significant reduction in ultimate tensile strength and modulus for the composites. On the other hand, Sharma et al. have demonstrated that growing CNTs on carbon fiber provides 69% improved tensile strength compared with that for untreated carbon fibers. [Sharma 2011]. Bekyarova et al. has demonstrated selective deposition of multi- and single walled carbon nanotubes (CNTs) on woven carbon fabric by an electrophoresis technique. [Bekyarova 2007 I]. The introduction of 0.25% of MWNTs in the carbon fiber (CF)/epoxy composites results in an enhancement of the interlaminar shear strength by 27% and significantly improved out-of-plane electrical conductivity. Reports on modification of the carbon fiber with surface treatment alone to increase the IFSS are also claimed. [He 2010; Li 2008; Moon 1992].

Besides engineering the carbon fiber to enhance the fiber/matrix interface, dispersing regular and functionalized CNTs in epoxy resin is another approach to achieve improvement in IFSS. [Zhu 2012; Zhu 2007; Zhu 2003; Che 2009; Ma 2009; Rubi 2011; Sui 2009]. Carbon nanotube fiber itself has also been used to evaluate the IFSS by other groups. [Ganesay 2011; Özden-Yenigün 2012; Zu 2012]. Bekyarova et al. have demonstrated dispersion of SWNT-COOH in epoxy and subsequent use for infiltration of carbon fabric (CF) by the vacuum assisted resin transfer molding technique to fabricate SWNT-COOH/epoxy/CF composites. [Bekyarova 2007 II]. Mechanical tests demonstrate that the incorporation of SWNT-COOH improves the mechanical performance of the composites and produces a 40% enhancement of the shear strength for a SWNT-COOH loading of 0.5 wt %. Tseng et al. and Cheng et al. have shown that functionalizing CNTs by plasma modification improves the tensile strength and electrical conductivity of covalently-integrated epoxy composites. [Tseng 2007; Cheng 2010]. Another approach for improving IFSS is to modify the interlaminar interface, which was used by Fan et al. and Tsotsis to fabricate the hybrid MWNT/glass/epoxy composites. [Fan 2008; Tsotsis 2009]. Up to 33% increase in the IFSS is reported by the introduction of MWNT into the composite. Multifunctional performance of carbon nanotube offering improvement in electrical and thermal conductivity by dispersing CNTs in thermoset and thermoplastic resin has been reported by many groups. [Assael 2009; Cheng 2010"; Kotaki 2009].

Godara et al. has compared the gain in IFSS by introducing carbon nanotube in unidirectional glass fiber/epoxy macro-composites in three ways: (1) in the fiber sizing, (2) in the matrix and (3) in the fiber sizing and matrix simultaneously. Interfacial shear strength was investigated using single-fiber push-out microindentation. [Godara 2010; Godara 2009]. The results of the test reveal an increase of IFSS in all three cases. The same group (Godara et al.) has demonstrated the influence of dispersed CNTs in epoxy matrix on the coefficient of thermal expansion (CTE) for various composites measured in the transverse direction to the fiber orientation. [Godara 2010; Godara 2009]. They have reported dispersing thin-MWNTs and functionalized (with amine group, —NH$_2$) double walled nanotubes (DWNTs) lowers the CTE most effectively compared to that of MWNTs. This is possibly because thin-MWNTs and functionalized DWNTs effectively block thermally induced movements of the chains, due to their reduced size and higher interaction, thereby significantly reducing the increase in free volume. The functionalized DWNTs are even more effective due to the alignment of the polymer chains along the CNTs in axial direction because of the presence of surface —NH$_2$ functional groups. This would result in a reduction in average free polymer chain length and association of part of the polymer chains with CNT having near-zero coefficient of thermal expansion (CTE), leading to a significant decrease in the CTE. Barber et al. have reported how the interfacial strength between a single CNTs and a polymer matrix increases dramatically when the nanotube surface is chemically modified, though the data scatter was very high. [Barber 2006; Barber 2003]. The tests have been conducted by pulling out single CNTs using an atomic force microscopy (AFM) tip. A comprehensive computational model has been developed for fiber pull-out test by Zhong et al. [Zhing 2003].

Advances in characterization of the IFSS have also been reported by some group on single fiber pull test conducted in-situ in a scanning electron microscope (SEM). Manoharan 2009. Desaeger et al. have demonstrated microindentation tests to evaluate IFSS on different kinds of reinforced polymer composites (carbon and glass fibers embedded in thermoplastic and thermoset matrices). [Desaeger 1993] Besides fiber reinforced polymer composites, metal and carbon[43] matrix composites are also being investigated for interfacial properties using nanoindentation technique [Ureña 2005; Tezcan 2008].

Despite these advances, major performance improvements are needed to address the increasing practical demands for light-weight, ultra-strong, ultra-high-modulus composites.

SUMMARY OF INVENTION

Applicants have discovered a novel method for fabricating carbon nanotube (CNT) sheet modified fiber and fiber tow composites having improved interfacial fiber/matrix bonding. This improved bonding results from helically wrapping a nanotube sheet about fibers or fiber tows, and using resin infiltration to couple fiber and matrix. Other methods grow CNTs directly on carbon fibers, which can induce damage on fiber surface during the required precursor deposition and CNTs growth process, whereas, this invented solid-state method overcomes such problems. The CNTs sheet modified fiber is embedded in a polymer matrix, where the fiber is in contact with the polymer through CNT/polymer nanocomposite in which the layered (single or multiple) nanotubes sheets are impregnated in polymers. Experimental investigations, both in micro and nano scale, have shown about 80% increases in interfacial shear strength by this materials combination.

A key requirement for successful practice of the present invention related to the nature of the wrapping of carbon nanotube sheet about a fiber (or fiber tow). The coupling of a nanotube or nanotube bundle to the polymer matrix forms CNT/polymer nanocomposite surrounding a fiber (or fiber tow) which increases the stiffness (modulus) and strength of the polymer surrounding a fiber (or fiber tow).

This method distinguishes itself from prior-art methods in that it deploys the ultra-high strength of individual nanotubes and the topological effect of more than one turn of nanotube wrapping to provide highly effective fiber (or fiber tow) coupling to the surrounding polymer matrix. In contrast with the popular methods of chemically modifying fiber surface or catalytically growing nanotubes on this surface, this topological method of fiber composite interface reinforcement does not weaken fiber strength associated with producing chemical defects on the fiber surface.

FIG. 1 shows a schematic diagram of a MWNT sheet 101 being scrolled circumferentially on a carbon fiber 102 at a wrapping (bias angle) α (it has a range between 0° and 90°). The MWNT sheet scrolled carbon fiber is then embedded into a polymer matrix.

FIGS. 2A-2B show the SEM images of different sections of a carbon fiber. FIGS. 2C-2D show SEM images of the same carbon fibers of FIGS. 2A-2B, respectively, when circumferentially scrolled with a MWNT Sheet of 2 mm wide.

The fiber tow has been infiltrated with polyvinyl alcohol (PVA) to bind the fibers within the tow. Tows of different diameters have been used in this work, they are 300 μm, 100

μm, 50 μm and 40 μm. Fiber tows in other diameter can be used. The MWNT aerogel sheets (5 mm wide for tow larger than 100 μm and 2 mm for tows smaller than 100 μm) have been scrolled around each of the fiber tows. To ensure that the number of fibers used in a tow is identical, a long fiber tow has been cut into smaller segments for making the scrolled fibers and for the control specimen (without the use of MWNT sheet scrolling). The wrapping angle, used in this work, was between 0° to 30° with the MWNT sheet aligned with the carbon fibers. Other wrapping angles (between 0° and 90°) can be used.

DESCRIPTION OF DRAWINGS

FIGS. 12A-12B show the magnitude of the exposed fiber ends after polishing.

DETAILED DESCRIPTION

Figure 1:
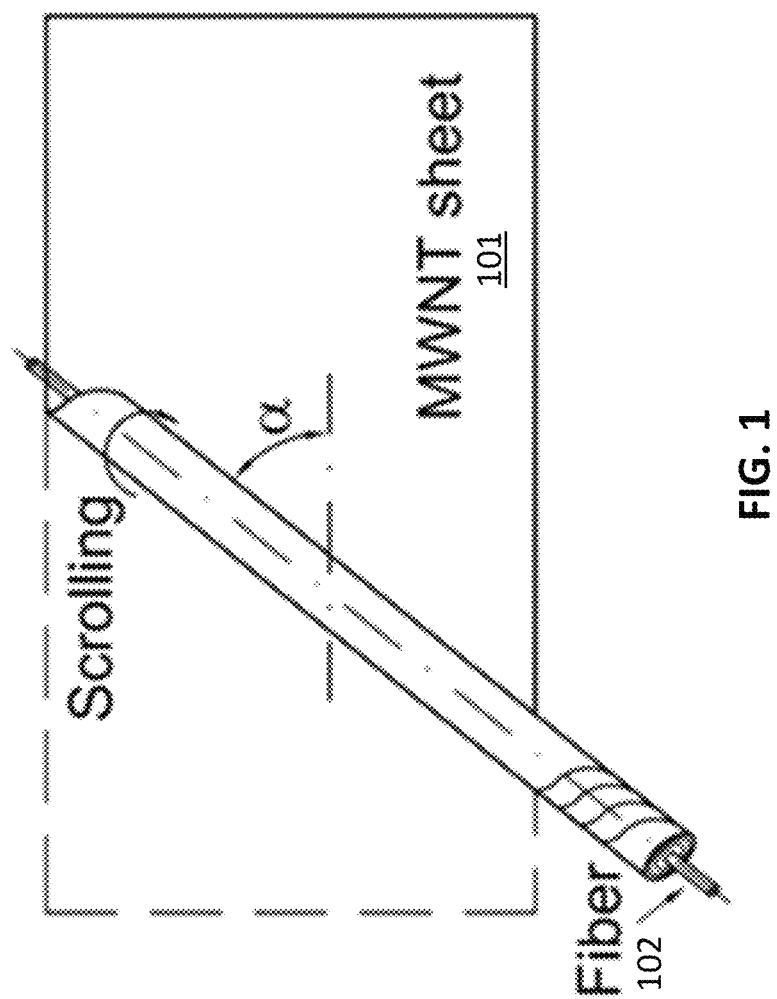
FIG. 1 is a schematic diagram showing a MWNT sheet scrolling a carbon fiber. (Drawing is not to scale).
Figure 2A:
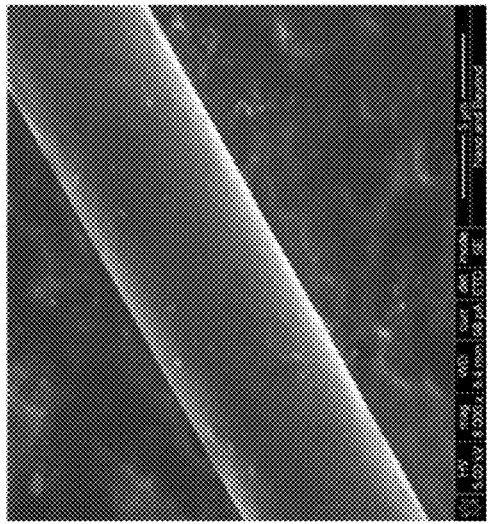
FIGS. 2A-2B are SEM images of neat carbon fibers.
Figure 2B:
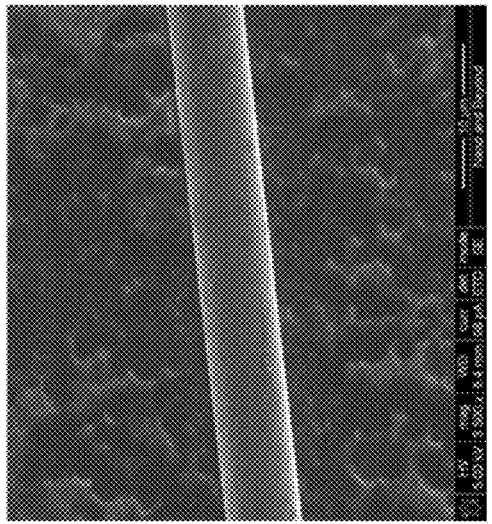
Figure 2C:
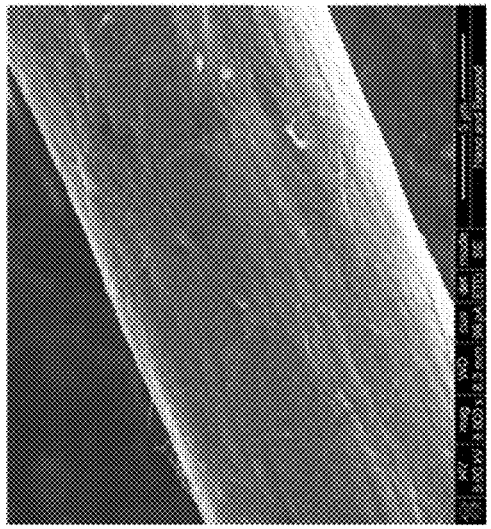
FIGS. 2C-2D are SEM images of carbon multiwalled nanotube (MWNT) sheet scrolled carbon fibers (the neat carbon fibers shown in FIGS. 2A-2B, respectively, after they are circumferentially scrolled with a 2 mm wide MWNT sheet).
Figure 2D:
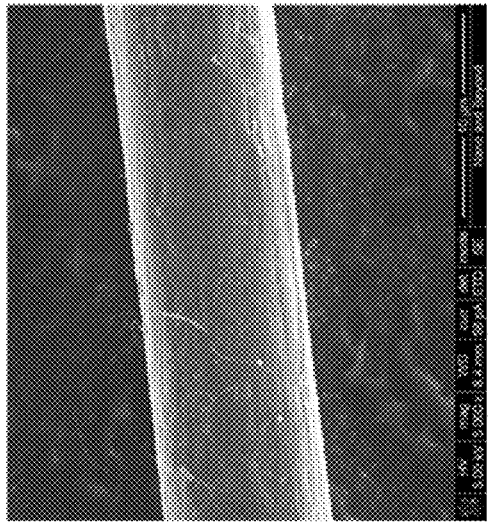

Single or multiple layers of CNT (single walled nanotube, double walled nanotube, multi walled nanotube. Functionalized nanotubes, etc) sheet (also called a web) will be scrolled around a fiber or fiber tow (carbon, graphite, glass, natural polymer, synthetic polymer, metallic, silicon carbide, Kevlar, etc.). Subsequently, the CNT scrolled fiber or fiber tow is embedded into a polymer (thermoset or thermoplastic, such as epoxy, polymers dispersed with nano/micro fillers, etc.) matrix. This method allows modification of the interface between fiber and polymer matrix to form CNT/polymer nanocomposite to provide significantly enhanced interfacial reinforcement (stiffness, interfacial strength, yield strength, compressive strength, toughness) in polymer matrix composites. This CNT sheet/web scrolled fiber embedded in polymer matrix also exhibits improved thermal and electrical conductivity for the polymer matrix composite.

Materials

Carbon nanotube sheets used for scrolling were drawn from a carbon nanotube forest that had been grown by chemical vapor deposition (CVD) using acetylene gas as the carbon precursor. The nanotubes have an outer diameter of ~10 nm and contain ~6 walls. Transparent, highly oriented MWNT sheets are fabricated by drawing from a MWNT forest. The as-produced MWNT sheets are aerogels having a carbon network density of ~1.5 mg/cm$^3$, which is close to that of air (dry air density is 1.2 mg/cm$^3$), and have a high specific strength (i.e., strength normalized to density) of up to 144 MPa·cm$^3$/g. Sheet areal density is between 1 μg/cm$^2$ and 3 μg/cm$^2$). Densification due to surface tension in acetone (or methanol, not used in this investigation) decreases sheet thickness to as low as ~50 nm and increases sheet specific strength to ~560 MPa cm$^3$/g. [Zhang 2005; Aliev 2009]. Alternatively, carbon nanotube sheets suitable for invention embodiments can be produced by synthesis of the nanotubes in the gas phase using floating catalyst methods and subsequent collection of these nanotubes in sheet form or as arrays that can be converted to sheet form.

PAN-based carbon fiber of 5.2 μm diameter with sizing is used in the work. The density of the carbon fiber is 1.78 g/cm$^3$. The tensile strength and modulus of the carbon fiber are 5.31 MPa and 276 GPa, respectively. Two different epoxy materials have been used: Loctite Epoxy used for general purpose (produced by Henkel) and high temperature aerospace grade BMI Matrimid® 5292A (produced by Huntsman) resin system [Loctite Epoxy; Matrimid 5292A].

Methods Used for Nanofiber Wrapping on Core Fibers and Fiber Tows

This CNT sheet/web can be scrolled around the fiber where the fiber is aligned or at angle with respect to the sheet length. This fiber is embedded in polymer matrix (either thermoplastic or thermoset) where the fiber or the fiber tow is in contact with the polymer through the scrolled nanotubes (single or multiple layered) in between.

Performance in a Composite

Significant improvement in interfacial shear strength has been observed when a fiber or fiber tow is circumferentially scrolled with MWNT sheet. Pull-out test, using tensile testing machine, in macro scale and push-out tests, using nanoindentation, in micro scale, have been conducted to investigate the effect of MWNT sheet present around the carbon fibers. Both general purpose and high temperature BMI resin matrix are used and improvements were found in all cases. Scrolling smaller diameter tows provide better interfacial improvements. In ideal case scrolling each individual fibers, having the highest surface to volume ratio, would provide the most improvements.

Fiber Pull-Out Test

Figure 3:
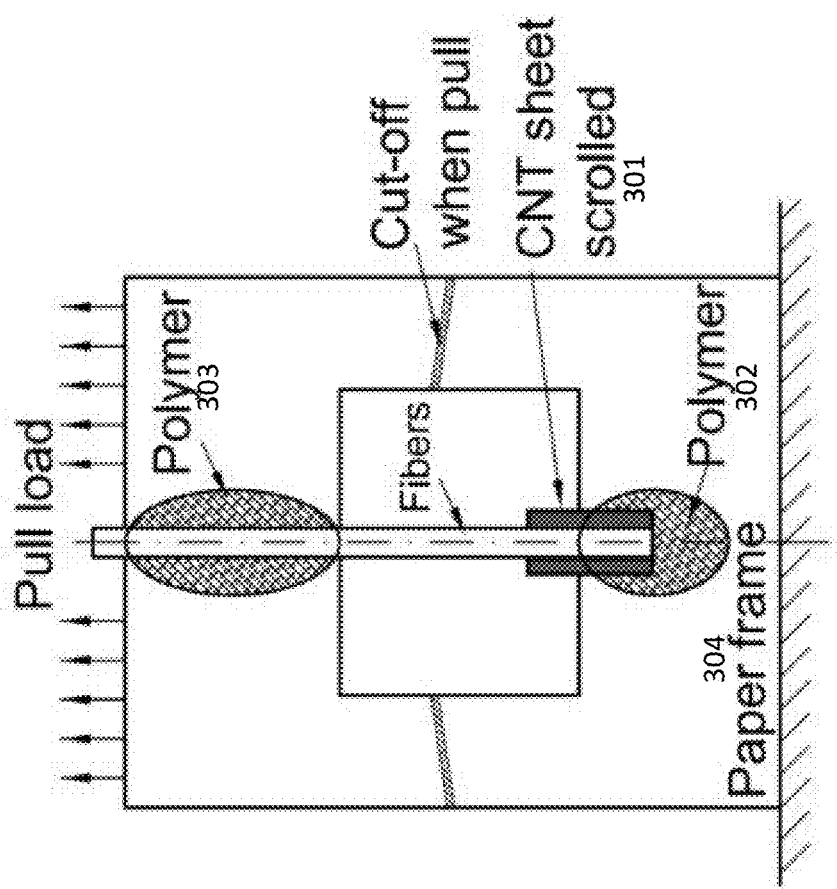
FIG. 3 is a schematic diagram for a fiber pull-out test when a MWNT scrolled fiber is embedded into a polymer at the bottom of the paper frame.

FIG. 3 shows a schematic diagram for a fiber pull-out test. A section of a MWNT scrolled fiber tow 301 is embedded into an epoxy 302 (Loctite Epoxy heavy duty, Henkel) at the bottom. The top portion of the fiber tow is embedded into a bigger block of polymer 303 to allow pulling. In preparation of the sample, the polymer embedded fiber tow is attached to a paper frame 304 for alignment. The embedded lengths of the scrolled fiber 301 in epoxy 302 have been controlled to be approximately 3 mm and 2 mm for 300 µm tow and 100 µm, respectively. After 2 hours of curing at room temperature, and mounting on a fixture in a material test system, both sides of the paper frame are cut.

These experiments have been conducted on an Instron materials test system using a load cell of 1 kN. The test is under displacement control and the loading rate is 1 mm/min. The pulling force as a function of the displacement is recorded and analyzed to determine the IFSS.

Figure 4:
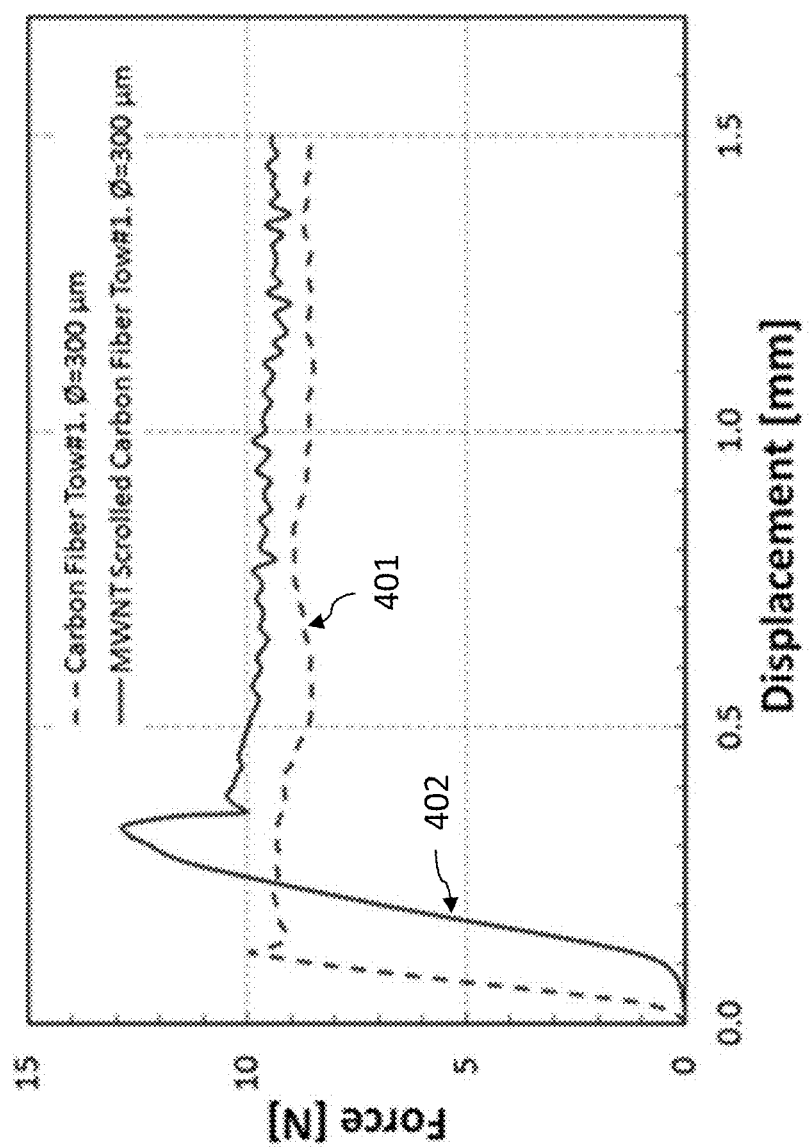
FIG. 4 is a graph that shows the force versus displacement in the pull-out tests for 300 μm diameter tow wrapped with CNT sheet embedded in bismaleimide (BMI) matrix, and the control (300 μm diameter tow embedded in BMI matrix (plot 402), no CNT sheet has been used to wrap the 300 μm fiber tow (plot 401)).
Figure 5:
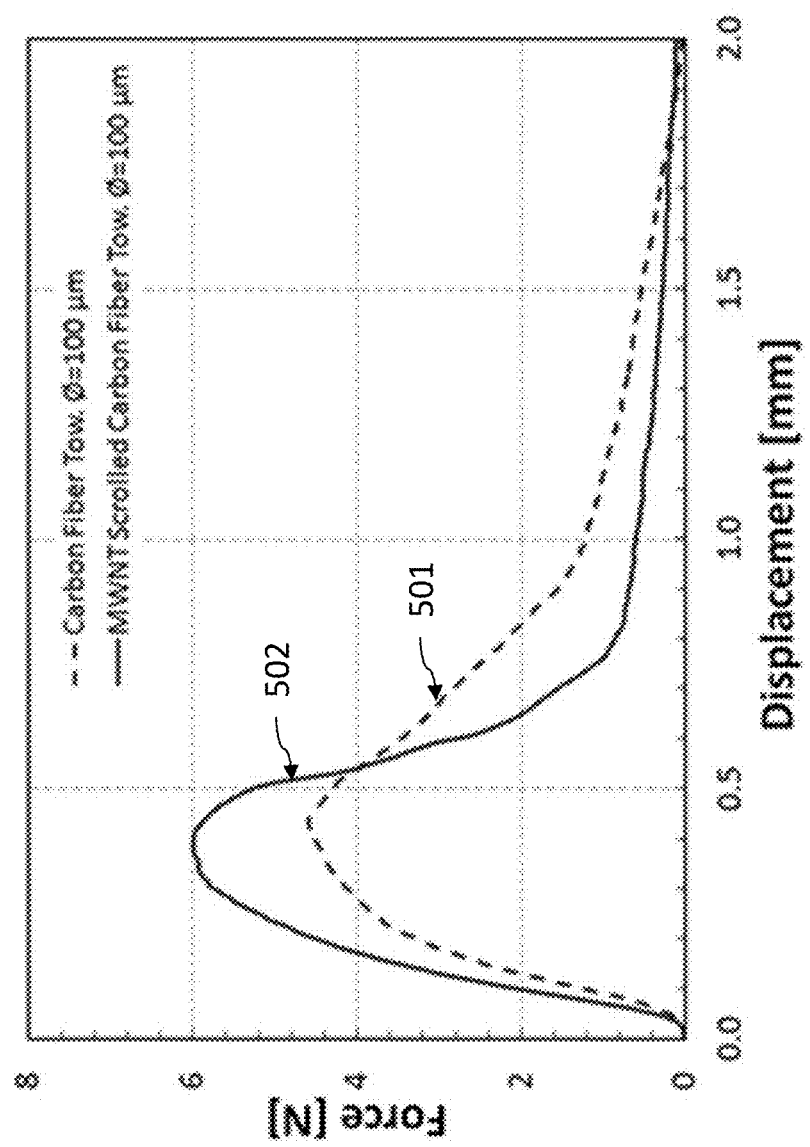
FIG. 5 is a graph that shows the force versus displacement in the pull-out tests for 100 μm tow (CNT wrapped 100 μm diameter tow embedded in BMI matrix (plot 502) and 100 μm diameter tow embedded in matrix without CNT wrapping (plot 501)).

FIGS. 4-5 show the pull-out force plotted as a function of displacement for neat and MWNT sheet scrolled fibers embedded in epoxy. The use of scrolled fiber embedded in epoxy has increased the pull-out force from an average of 9.85 N to an average of 12.82 N for the 300 µm tow (an increase of 19%), and has increased the pull-out force from 4.58 N to 6.0 N for the 100 µm tow (an increase of 30%). The area enclosed by the pull-out force-displacement curve up to the peak load, indicative of the toughness or ductility of the interface, has improved in both cases. The curve profiles after peak loads are different due potentially to the embedment length and difference in cure times. The contact surface areas (between MWNT and fibers) to volume ratios are estimated to be 0.013 and 0.04 $\mu m^{-1}$, for 300 µm tow and 100 µm, respectively. The contact between MWNTs and fibers was made at the outer fibers of the fiber tow. It is anticipated that with the reduction of the fiber tow diameter, the contact surface area to volume index will increase following 2/R, with R being the diameter of the tow. Therefore tows having smaller diameter or in an ideal case individual fiber would have the maximum surface to volume ratio. In the case where a single fiber, with a diameter 5 µm, is wrapped around by MWNT sheet, the surface area to volume ratio increases to 0.8 $\mu m^{-1}$, which is 61 times or 40 times the corresponding values for the 300 µm tow and 100 µm tow, respectively. As a result, the interfacial shear strength is anticipated to increase significantly.

Table 1 summarizes the results for the pull-out tests. Table 1 shows a comparison of interfacial properties of neat and MWNT scrolled carbon fiber tows embedded in Loctite Epoxy resin matrix measured by pull-out test.

TABLE 1

|  | Neat Carbon Fiber | MWNT Scrolled Carbon Fiber | Neat Carbon Fiber | MWNT Scrolled Carbon Fiber |
| --- | --- | --- | --- | --- |
| Pull-out Force, N | 9.85 | 12.82 | 4.58 | 6 |
| Fiber Tow Diameter, mm | 0.3 | 0.3 | 0.1 | 0.1 |
| Embedded Length, mm | 2 | 2 | 2 | 2 |
| IFSS, MPa | 5.23 | 6.8 | 7.29 | 9.55 |
| % Improvement | — | 30.15% | — | 31.00% |

Fiber Push-Out Test

Figure 6:
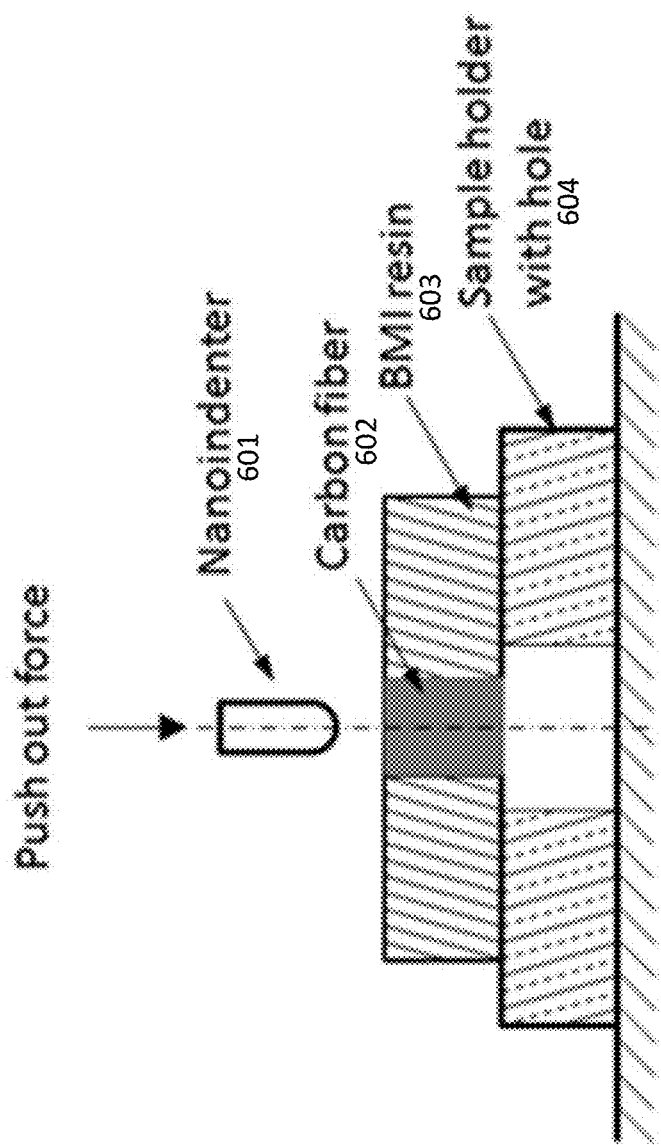
FIG. 6 shows a schematic view of the push-out test configuration using a nanoindentation technique.

FIG. 6 shows the schematic of the push-out test using a spherical tip nanoindenter 601. The diameter of the tip is 10 µm. The maximum tow diameter of 50 µm is used with the 10 µm tip. The neat and nanotube scrolled fiber and fiber tows 602 are embedded in the polymer 603 cured in disks of 150 µm and 60 µm thick, respectively. The 150 µm thick specimens are used for loading-unloading and the 60 µm thick specimens are used for complete fiber push-out test. A supporting metal disk 604 with a hole larger than the tow diameter is placed below the specimen so that there is space available for the pushed out fiber tow. Load displacement data has been recorded for the IFSS calculation.

Figure 7:
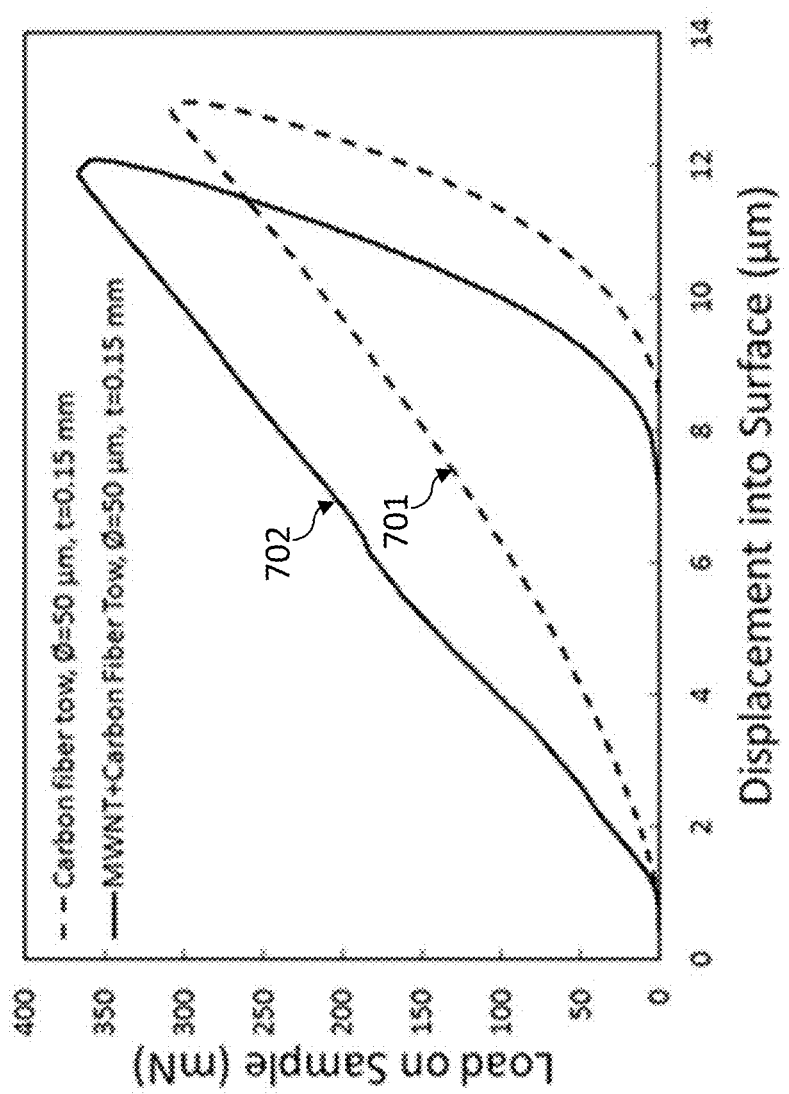
FIG. 7 is a graph that shows the load displacement results for the push-out tests, where the fibers tows are not completely pushed out, showing increased interfacial strength for MWNT scrolled carbon fiber tow compared to the tow without MWNT.

FIG. 7 shows the loading-unloading force data for the push-out test for neat and MWNT sheet scrolled fibers as a function of displacement. In this test configuration, unloading portion of the load-displacement curve was also recorded. As shown in FIG. 7, the area under the load-displacement curve, a measure of the toughness, is significantly higher for MWNT sheet scrolled fiber embedded in polymer matrix (curve 702) than for the case which does not contain CNT wrapping around a carbon fiber (curve 701).

Figure 8:
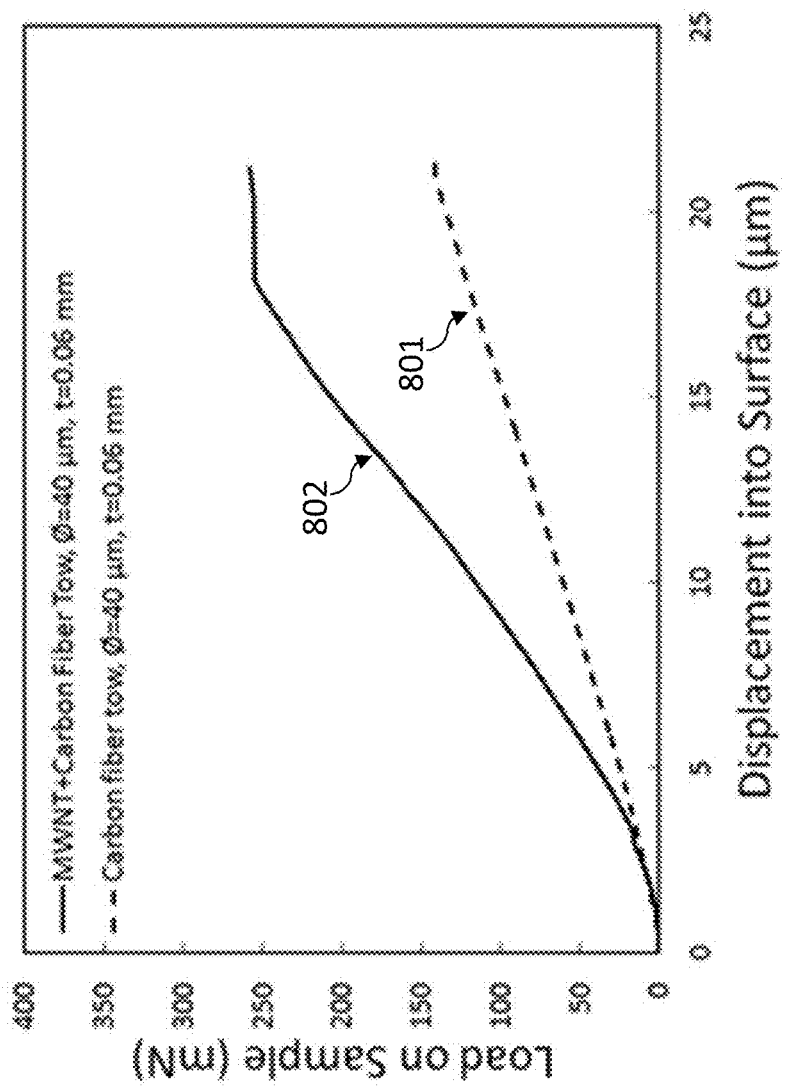
FIG. 8 is a graph that shows the load displacement plots for the push-out tests, showing increased push-out force required for the MWNT scrolled carbon fiber tow compared to the one without embodiment of MWNT.

Complete push-out test results are shown in FIG. 8 (curve 802 for the MWNT sheet scrolled fiber embedded in polymer matrix and curve 801 for the case which does not contain CNT wrapping around a carbon fiber). In this case the tow diameter is 40 µm and the specimen thickness is 60 µm. The push-out force gradually increases and saturates during the debonding and push-out process. This saturation period is very short and depends on the thickness of the specimen.

Table 2 summarizes the improvement in interfacial shear strength after scrolling fiber with carbon nanotube sheet. Table 3 shows a comparison of interfacial properties of neat and MWNT scrolled carbon fiber embedded in Matrimide 5292 BMI resin matrix measured by push-out test.

TABLE 2

|  | Neat Carbon Fiber Embedded in Epoxy | MWNT Scrolled Carbon Fiber Embedded in Epoxy |
| --- | --- | --- |
| Pull-Out Force, mN | 141.68 | 256.05 |
| Fiber Tow Diameter, mm | 0.04 | 0.04 |
| Embedded Length, mm | 0.06 | 0.06 |
| IFSS, MPa | 18.79 | 33.96 |
| % Improvement | — | 80.72% |

The key advantage of using scrolled MWNT sheet over growing nanotubes on fiber surface is that MWNT sheet provides a continuous covering of the fiber with excellent surface adhesion and then the sheet itself is engaged in interacting with the surrounding polymer matrix. This provides a significant increase in available surface area that is firmly adhered to the core of the structure, the fiber. CNT sheet can also be wrapped around carbon fiber with carbon nanotube grown radially. Reinforcement due to the strong adhesion of CNT sheet at both sides with fiber and matrix, the negative thermal expansion coefficient of the nanotube also provide significant benefit to minimize the local debonding due to exposure to thermal oxidation when the composite is subject to high temperatures.

Polishing Test

Figure 9:
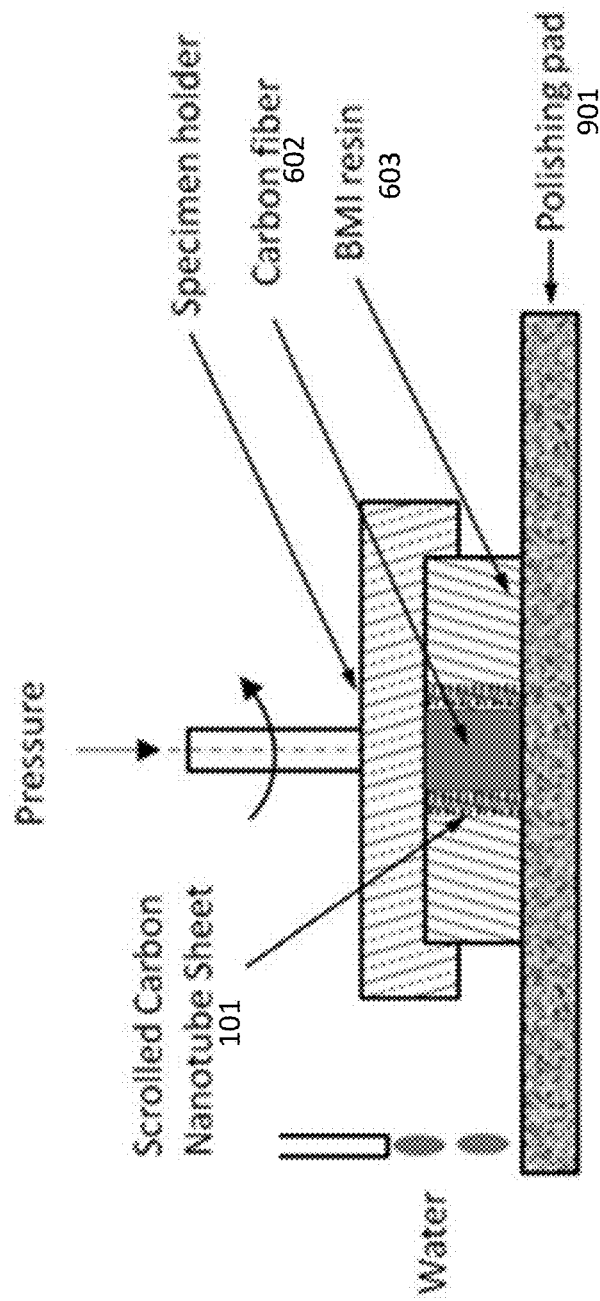
FIG. 9 shows a schematic view of the polishing test of the carbon nanotubes scrolled carbon fiber embedded in polymer matrix.

Carbon nanotube scrolled single carbon fiber embedded in polymer matrix and the same without any carbon nanotube have been polished using sand paper (4000) and later in a pad 901 with 0.3 µm aluminum powder, as shown in FIG. 9.

Figure 10A:
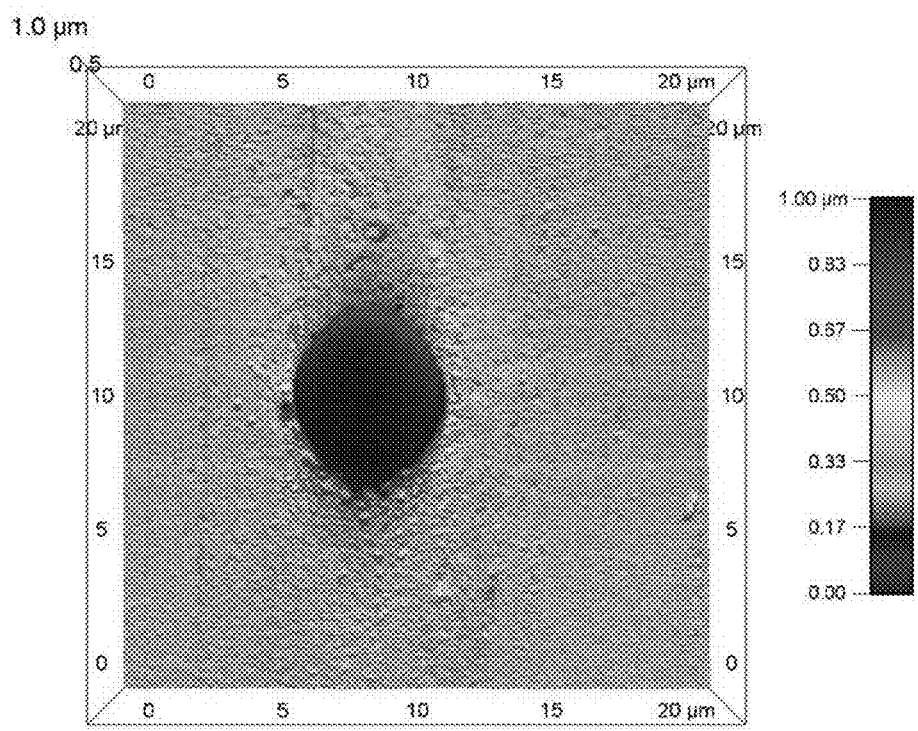
FIG. 10A is a surface topography (top view) taken by atomic force microscopy of an exposed carbon fiber after polishing.
Figure 10B:
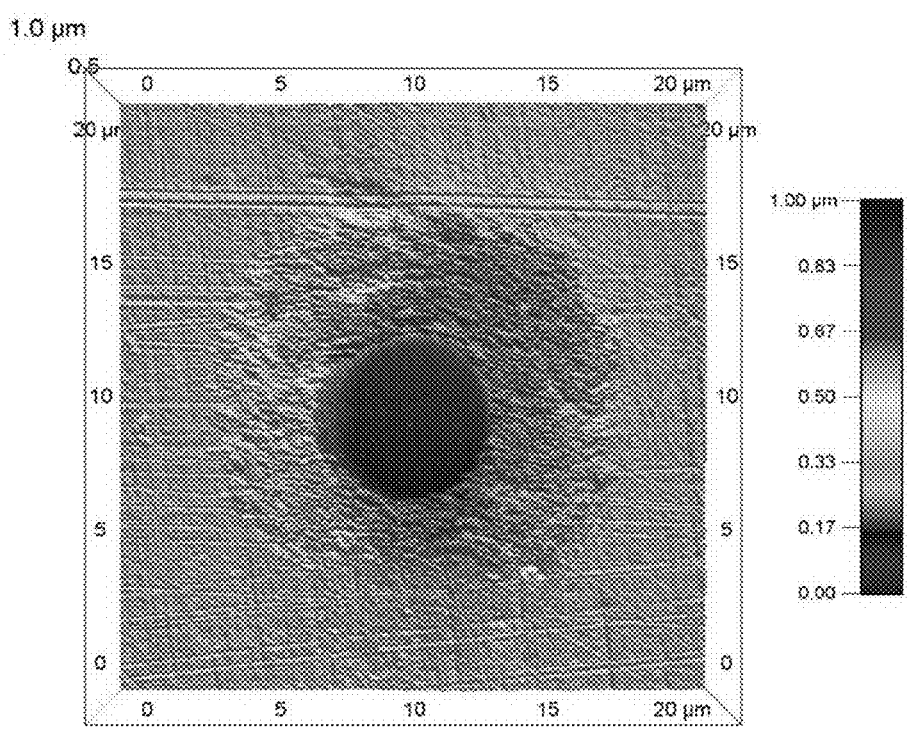
FIG. 10B is a surface topography (top view) taken by atomic force microscopy of a carbon nanotube scrolled carbon fiber when embedded in polymer matrix.
Figure 11A:
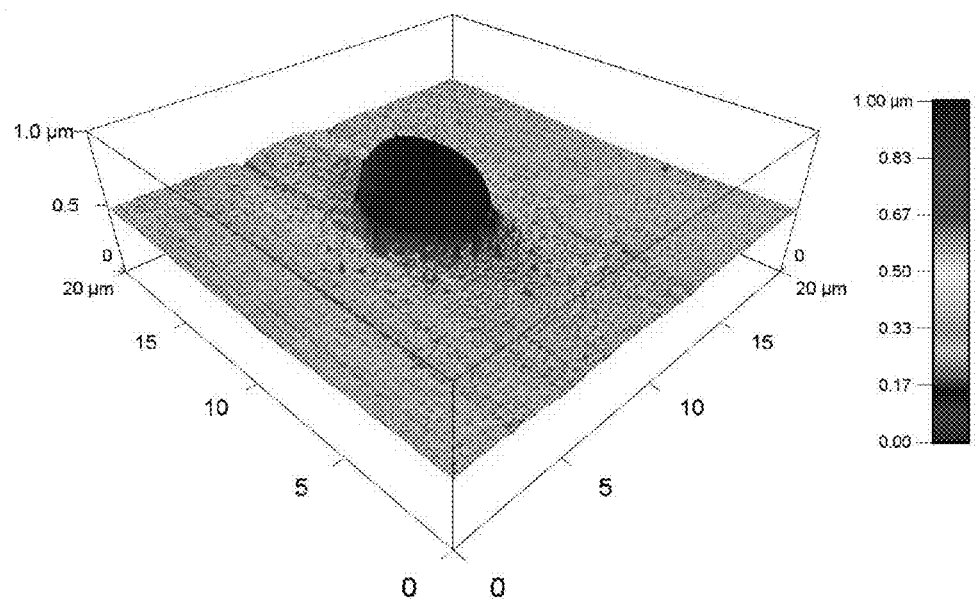
FIG. 11A is a surface topography (isometric view) taken by atomic force microscopy of an exposed carbon fiber.
Figure 11B:
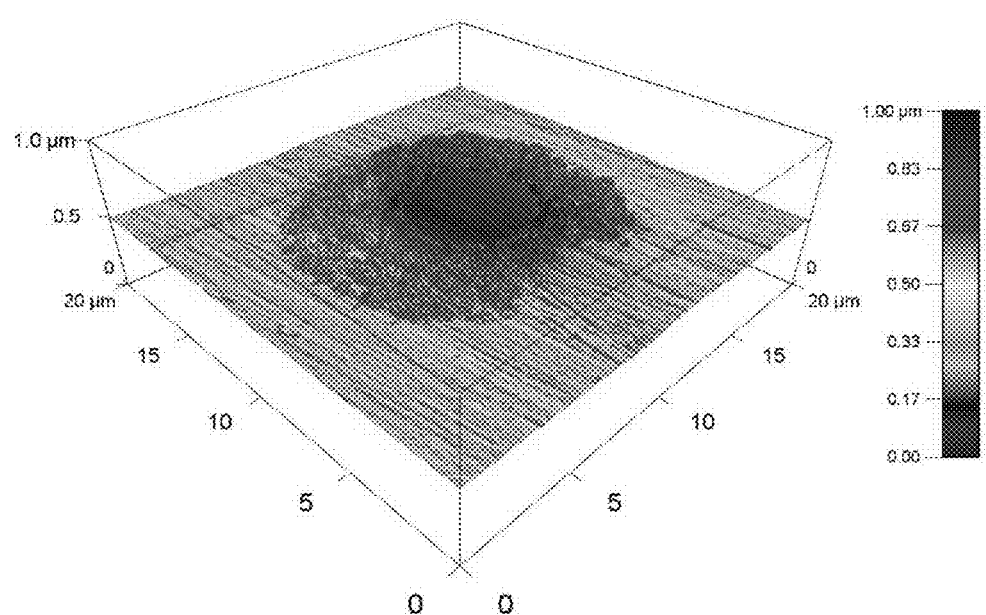
FIG. 11B is a surface topography (isometric view) taken by atomic force microscopy of a carbon nanotube scrolled carbon fiber when embedded in polymer matrix.
Figure 12A:
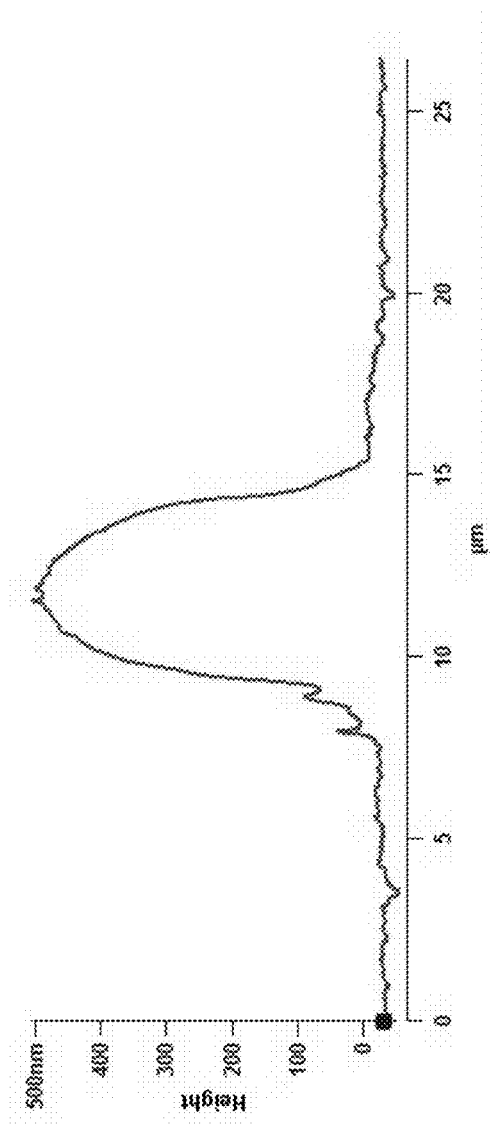
FIG. 12A is a graph that shows a line section profile along the fiber center for a neat carbon fiber.
Figure 12B:
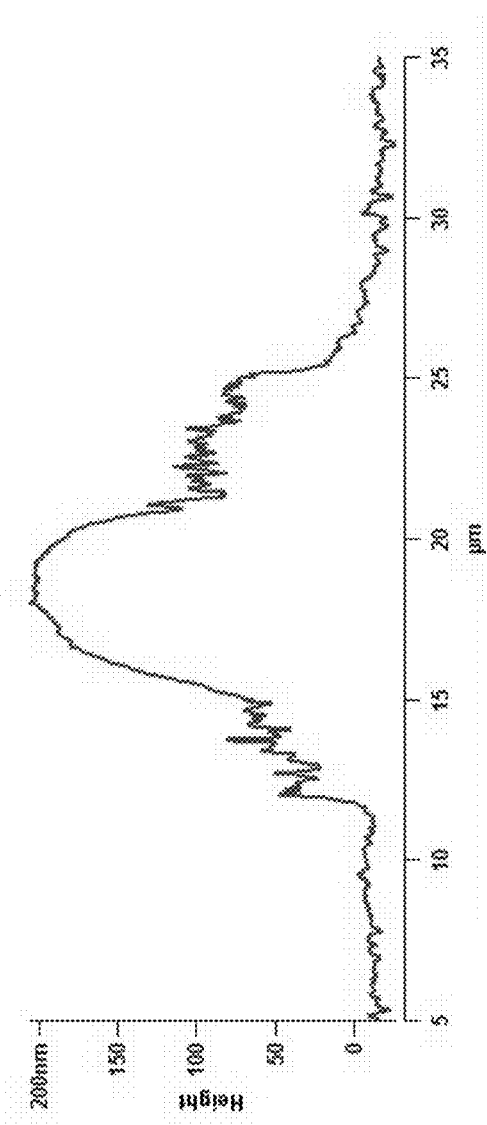
FIG. 12B is a graph that shows a line section profile along the fiber center for a carbon nanotube scrolled carbon fiber.

It is well documented that when composite specimens are polished for imaging, the stiffer fibers wear at a slower rate than the parent matrix leading to topographic differences between the fibers and the surrounding matrix [Schoeppner 2007]. Strong difference in modulus and hardness of the fiber and polymer matrix causes exposure of the fiber end due to extra wearing to the polymer matrix as evident in FIGS. 10-12. This causes a significant difference in surface topography that is more prone to interfacial failure due to the availability of extra surface area of the previously embedded fiber. This mismatch of the wear behavior and hence the susceptibility toward interfacial weakness is dramatically reduced by the scrolling of carbon nanotube around the fiber. There is 135% reduction in the mismatch for exposed fiber ends, which is consistent with the significant improvement in interfacial shear strength determined from push-out test shown in Table 2.

Figure 13:
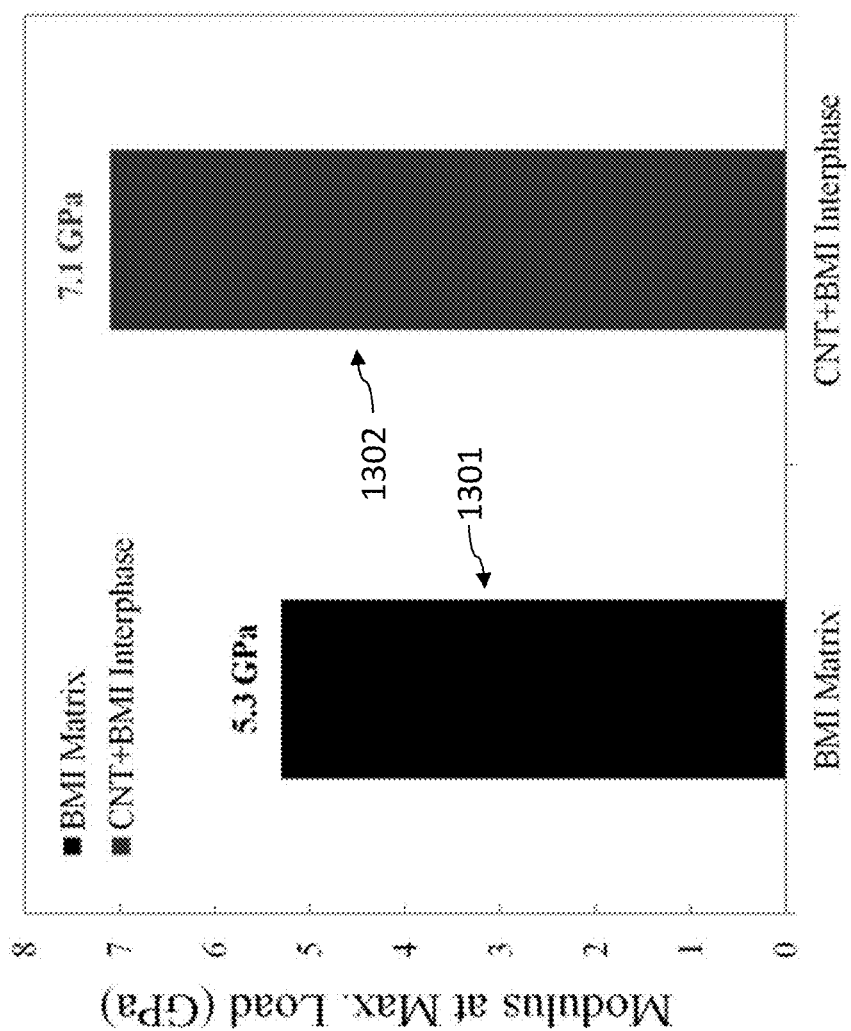
FIG. 13 is a graph that shows the surface Young's modulus of neat bismaleimide (BMI) resin and MWNT/BMI resin interphase measured using nanoindentation technique (bars 1301 and 1302, respectively).

Measurement of modulus has been conducted using a cube corner nanoindenter tip has been conducted on neat BMI matrix and on MWNT/BMI matrix interphase. The surface modulus has increased from 5.3 GPa to 7.1 GPa (an increase of 34%) as shown in FIG. 13.

Table 3 shows a comparison of exposed length of neat and MWNT scrolled carbon fiber embedded in Matrimide 5292 BMI resin matrix measured using a atomic force microscope (Asylum MFP-3D Stand Alone).

TABLE 3

|  | Neat Carbon Fiber | MWNT Scrolled Carbon Fiber |
|---|---|---|
| Exposed Length of Fiber End, nm | 486.00 | 207.00 |
| % Improvement | — | 135% |

Table 4 shows a comparison of surface Young's modulus of neat BMI resin and MWNT/BMI matrix interphase.

TABLE 4

|  | Neat BMI Matrix | MWNT/BMI Matrix Interphase |
|---|---|---|
| Surface Young's Modulus, GPa | 5.3 | 7.1 |
| % Improvement | — | 34% |

Compression Test

Figure 14:
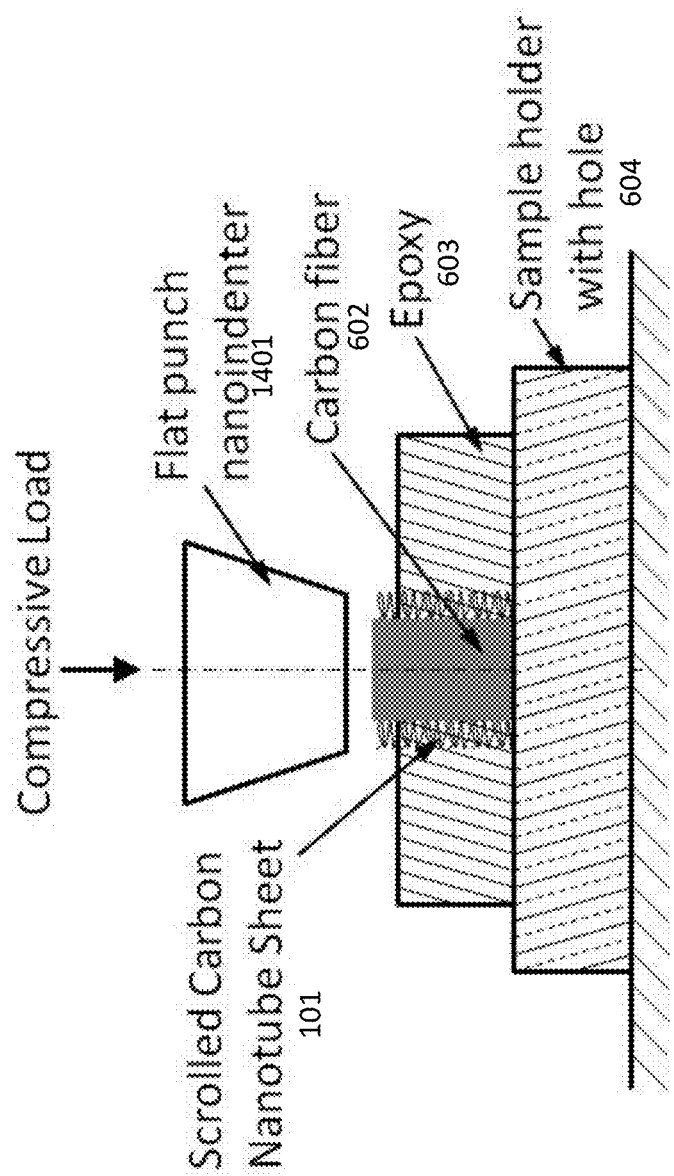
FIG. 14 shows a schematic view of the compression test of the carbon nanotubes scrolled carbon fiber embedded in polymer matrix.

Carbon nanotube scrolled single carbon fiber embedded in polymer matrix and the same without any carbon nanotube have been subjected to compressive load using a flat punch nanoindentor 1401, in a configuration with schematic diagram shown in FIG. 14.

Figure 15:
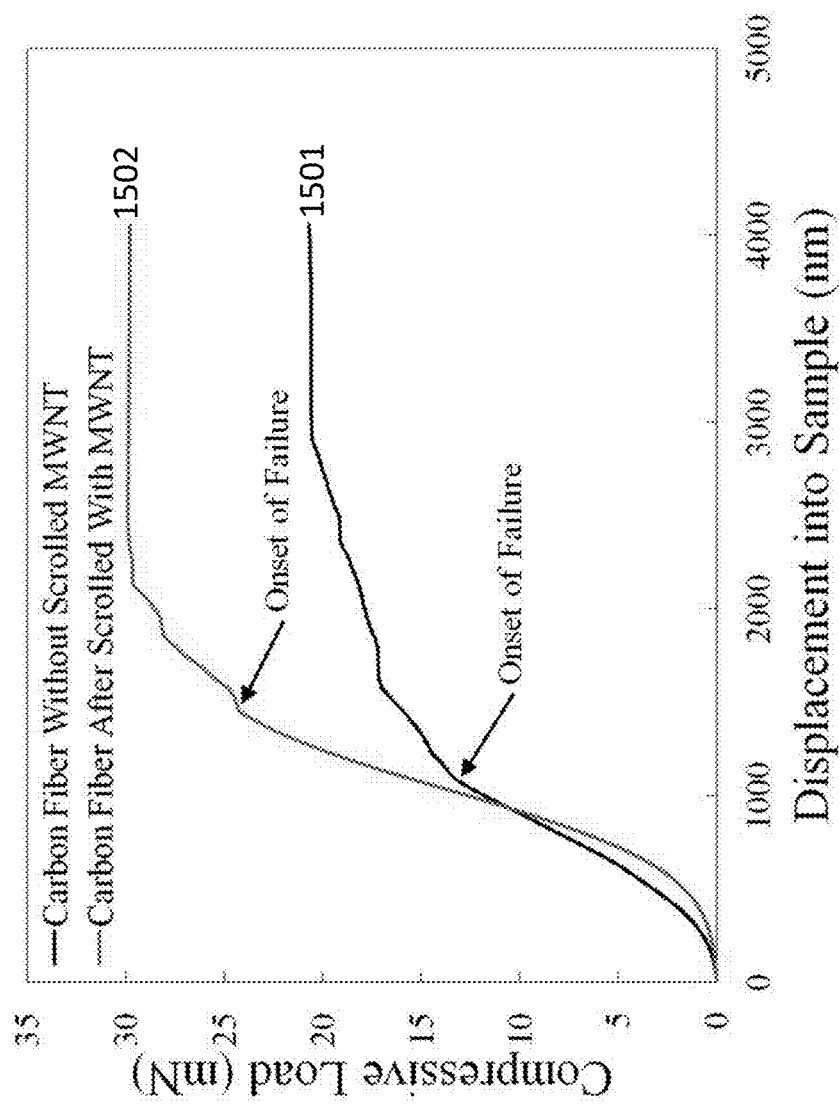
FIG. 15 is a graph that shows the load-displacement plots for the compression tests of single carbon fiber and MWNT scrolled carbon fiber embedded in BMI matrix, showing delayed onset of failure and increased peak compressive load for the MWNT scrolled carbon fiber tow compared to the one without MWNT.

Micro-buckling of a fiber in composites, under compression, is a major cause of failure. FIG. 15 shows the force vs. displacement for a compression test of single carbon fiber and MWNT scrolled carbon fiber embedded in BMI matrix (plots 1501 and 1502, respectively). The specimens have been polished until 180 µm thick giving a characteristic aspect ratio (thickness to diameter ratio) of 36 for the 5 µm carbon fiber. A nanoindenter tip of 2.2 µm has been used to apply compressive load on the carbon fiber in the two cases. For the onset of the failure, the use of MWNT scrolled carbon fiber has shown an increase from 13.37 mN to 23.80 mN (an increase of 78%). MWNT scrolled carbon fiber has shown an increase of peak compressive load from 20.58 mN to 29.78 mN (an increase of 45%).

Table 5 shows a comparison of exposed length of neat and MWNT scrolled carbon fiber embedded in Matrimide 5292 BMI resin matrix measured.

TABLE 5

|  | Neat Carbon Fiber | MWNT Scrolled Carbon Fiber |
|---|---|---|
| Onset of Failure, mN | 13.37 | 23.80 |
| % Improvement | — | 78% |
| Peak Compressive Load, mN | 20.58 | 29.78 |
| % Improvement | — | 45% |

False Twist Process

Figure 16:
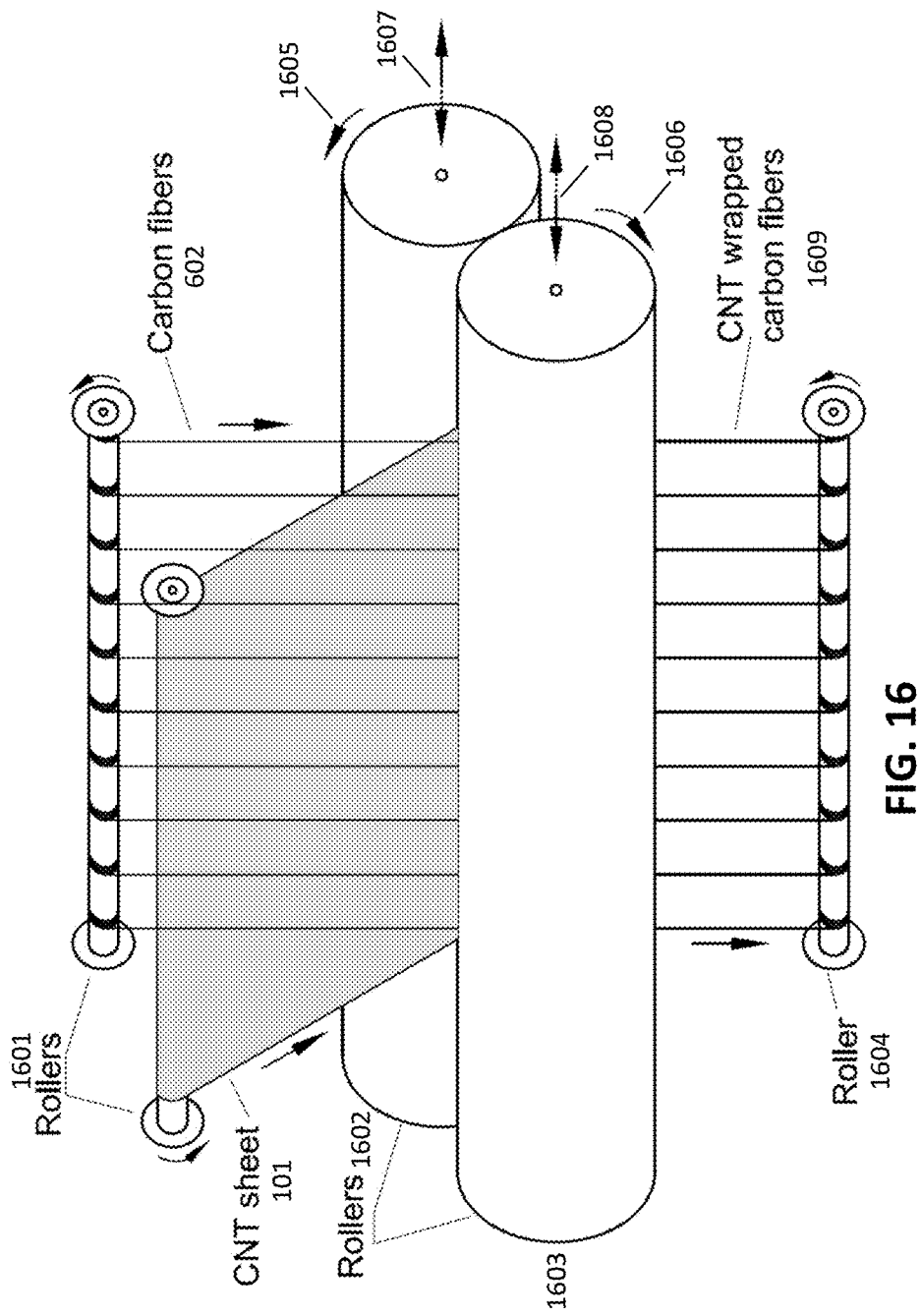
FIG. 16 is a schematic diagram showing a false-twisting process for wrapping CNT sheet on carbon fibers in scaled-up production.

FIG. 16 shows a schematic diagram of two rollers 1602 and 1603 rotating about their own axes, while oscillating along their respective axial directions. As shown in FIG. 16, roller 1602 is moving in a counterclockwise direction (shown by arrow 1605) and roller 1603 is moving in a clockwise direction (shown by arrow 1606). In the oscillation illustrated in FIG. 16, (a) roller 1602 moves axially in the right direction (shown by the solid line of double arrow 1607) when roller 1603 moves axially in the left direction (shown by the solid line of double arrow 1608) and (b) roller 1602 moves axially in the left direction (shown by the dashed line of double arrow 1607) when roller 1603 moves axially in the right direction (shown by the dashed line of double arrow 1608).

As rollers 1602 and 1603 move along their axial directions (such as in the direction of the solid line of double arrows 1607 and 1608, respectively), they will wrap CNT sheet on one section of carbon fibers (unrolled from rollers 1601). In next motion, when rollers 1602 and 1603 are moving in opposite axial directions (such as in the direction of the dashed line of double arrows 1607 and 1608, respectively), rollers 1602 and 1603 will wrap CNT sheet 101 on the carbon fiber 602 in the opposite circumferential directions. During this process, the rollers 1601, 1602, 1603, and 1604 will rotate about their own axes (which are parallel to the axes of rollers 1602 and 1603), thus allowing this process to continue. This method allows wrapping large number of carbon fibers 602 in preparation of CNT sheet wrapped carbon fibers 1609. The surface of the rollers 1602 and 1603 is preferably comprised of a metal layer, a plastic layer, a rubber layer, or a combination thereof.

Applications

The present invention distinguishes itself from the other cases where carbon nanotubes are grown or grafted on individual fiber in a number of ways.

A helically wrapped fiber or fiber tows (carbon, glass, natural, synthetic, etc) wrapped using single or multiple layers of carbon nanotube sheet at bias angles between 0° and 90° provides significant increase in interfacial properties and strengthens the matrix properties surrounding the fiber in the composites. As the length of carbon nanotube sheet is longer than the diameter of the fiber, the carbon nanotube sheet has to be broken first to break the fiber interface between carbon fiber and polymer matrix.

This method provides large area contact between carbon nanotube and fiber generating enhanced interfacial bonding. Other methods provide only point or line contact between the two resulting relatively weaker bonding.

The helical structured carbon nanotubes sheet interface between fiber and matrix provide high concentration of carbon nanotube producing high volume fraction of carbon nanotube in polymer to form CNT/polymer nanocomposite and hence strengthening the interface. Polymer matrix is impregnated into the carbon nanotube interface providing access between fiber and polymer matrix as well. The compressive and yield strength are also significantly increased due to the formation of CNT/polymer nanocomposite.

Conventional methods are limited by the fact the fiber surface might not be entirely covered by nanotubes leaving space for direct fiber matrix contact which is not desirable.

This method provides higher surface contact area between carbon nanotube and matrix including the benefit of the CNT aerogel or zerogel with highly porous CNT structures with high surface area compared to the conventional methods.

Conventional methods commonly engage the nanotubes with the polymer matrix as line contact where the nanotubes are weakly supported on the fiber surface whereas in the present method the matrix is in surface contact with the aerogel like nanotube sheet which itself is well adhered to the stiff fiber structures.

This fabrication method included solid state scrolling of the as-produced or densified carbon nanotube sheet around fiber whereas the other methods requires fiber to be inside the CVD reactor to graft nanotubes on fiber surface which is more complex, expensive.

The method provides a uniform and continuous areal surface contact between nanotubes and fiber whereas conventional methods provide discrete and point surface contact between the two.

Interlocking mechanism point and line contact in conventional methods vs. diffused polymer into carbon nanotube networks for this method.

This present invention has the potential to be scale-up compared to conventional methods where use of CVD reactor to grow carbon nanotube on fiber limits up scalability.

Single walled carbon nanotube sheet can be used for the scrolling/wrapping process.

Double walled carbon nanotube sheet can be used for the scrolling/wrapping process.

Multi walled carbon nanotube sheet can be used for the scrolling/wrapping process.

A single or multiple layers of the above can be sued for the scrolling/wrapping process.

A wrapping/bias angle of 0° to 90° can be implemented for the scrolling/wrapping process.

Multiple CNT sheet can be wrapped around a fiber or fiber tow at different bias angles.

The wrapped CNT sheets infiltrated with polymer forms nanocomposites surrounding a fiber or fiber tow (carbon, graphite, glass, natural polymer, synthetic polymer, metallic, silicon carbide, Kevlar (poly-paraphenylene terephthalamide), etc.). The nanocomposite enhances stiffness (modulus) and yield strength to provide support to the fiber when it is in compression to resistance to increase the microbuckling and higher compressive strength results.

The interfacial shear strength at the fiber/matrix interface of the fiber reinforced polymer composites has been increased.

The compressive strength of the fiber reinforced polymer composites has been increased.

The yield strength of the fiber reinforced polymer composites has been increased.

The toughness and stiffness of the fiber reinforced polymer composites have been increased.

The nanotube scrolling process has significantly improved the overall mechanical properties of the polymer matrix surrounding the fiber in the composite.

Additional Information

The examples provided herein are to more fully illustrate some of the embodiments of the present invention. It should be appreciated by those of skill in the art that the techniques disclosed in the examples which follow represent techniques discovered by the Applicant to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

Various Features of the Invention

The present invention includes a novel method of fabricating carbon nanotube sheet scrolled fiber and fiber tows (carbon, graphite, glass, natural polymer, synthetic polymer, metallic, silicon carbide, Kevlar, etc.) in composites with improved interfacial shear strength, compressive strength, yield strength, stiffness and toughness has been reported. Single or multiple layers of carbon nanotube sheet, with a bias/wrapping angle of 0° and 90°, has been scrolled around single fiber and fibers tows to improve the above mentioned mechanical properties of the matrix surrounding the fiber. Other common methods of growing CNTs directly on the fibers actually damage the fiber surface during the required precursor deposition and CNTs growth process. This demonstrated solid-state method overcomes such known problems. The CNTs sheet scrolled fiber is embedded into the polymer matrix exhibits significant (80%) increase in interfacial shear strength, compressive strength and toughness.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

REFERENCES

"Aliev 2009": Aliev A E, Oh J, Kozlov M E, Kuznetsov A A, Fang S, Fonseca A F, Ovalle R, Lima M D, Hague M H, Gartstein Y N, Zhang M, Zakhidov A A, Baughman R H. Giant-Stroke, Superelastic Carbon Nanotube Aerogel Muscles. Science 2009; 323(5921):1575-1578.

"Assael 2009": Assael M J, Antoniadis K D, Metaxa I N. Measurements on the Enhancement of the Thermal Conductivity of an Epoxy Resin when Reinforced with Glass Fiber and Carbon Multiwalled Nanotubes. Journal of Chemical & Engineering Data 2009; 54(9):2365-2370.

"Barber 2003": Barber A H, Cohen S R, Wagner H D. Measurement of carbon nanotube-polymer interfacial strength. Applied Physics Letters 2003; 82(23):4140-4142.

"Barber 2006": Barber A, Cohen S, Eitan A, Schadler L, Wagner H. Fracture Transitions at a Carbon-Nanotube/Polymer Interface. Advanced Materials 2006; 18(1):83-87.

"Bekyarova 2007 I": Bekyarova E, Thostenson E T, Yu A, Kim H, Gao J, Tang J, Hahn H T, Chou T W, Itkis M E, Haddon R C. Multiscale Carbon Nanotube-Carbon Fiber Reinforcement for Advanced Epoxy Composites. Langmuir 2007; 23(7):3970-3974.

"Bekyarova 2007 II": Bekyarova E, Thostenson E T, Yu A, Itkis M E, Fakhrutdinov D, Chou T W, Haddon R C. Functionalized Single-Walled Carbon Nanotubes for Carbon Fiber-Epoxy Composites. The Journal of Physical Chemistry C 2007; 111(48):17865-17871.

"Che 2009": Che J, Yuan W, Jiang G, Dai J, Lim S Y, Chan-Park M B. Epoxy Composite Fibers Reinforced with Aligned Single-Walled Carbon Nanotubes Functionalized with Generation 0-2 Dendritic Poly(amidoamine). Chemistry of Materials 2009; 21(8):1471-1479.

"Cheng 2010": Cheng Q, Wang B, Zhang C, Liang Z. Functionalized Carbon-Nanotube Sheet/Bismaleimide Nanocomposites: Mechanical and Electrical Performance Beyond Carbon-Fiber Composites. Small 2010; 6(6):763-767.

"Desaeger 1993": Desaeger M, Verpoest I. On the use of the micro-indentation test technique to measure the interfacial shear strength of fibre-reinforced polymer composites. Composites Science and Technology 1993; 48(1-4):215-226.

"Ding 2003": Ding W, Eitan A, Fisher F T, Chen, Dikin D A, Andrews R, Brinson L C, Schadler L S, Ruoff R S. Direct Observation of Polymer Sheathing in Carbon Nanotube-Polycarbonate Composites. Nano Letters 2003; 3(11):1593-1597.

"Fan 2008": Fan Z, Santare M H, Advani S G. Interlaminar shear strength of glass fiber reinforced epoxy composites enhanced with multi-walled carbon nanotubes. Composites Part A: Applied Science and Manufacturing 2008; 39(3):540-554.

"Ganesay 2011": Ganesan Y, Peng C, Lu Y, Loya P E, Moloney P, Barrera E, Yakobson B I, Tour J M, Ballarini R, Lou J. Interface Toughness of Carbon Nanotube Reinforced Epoxy Composites. ACS Applied Materials & Interfaces 2011; 3(2):129-134.

"Godara 2009": Godara A, Mezzo L, Luizi F, Warner A, Lomov S V, van Vuure A W, Gorbatikh L, Moldenaers P, Verpoest I. Influence of carbon nanotube reinforcement on the processing and the mechanical behaviour of carbon fiber/epoxy composites. Carbon 2009; 47(12):2914-2923.

"Godara 2010": Godara A, Gorbatikh L, Kalinka G, Warner A, Rochez O, Mezzo L, Luizi F, van Vuure A W, Lomov S V, Verpoest I. Interfacial shear strength of a glass fiber/epoxy bonding in composites modified with carbon nanotubes. Composites Science and Technology 2010; 70(9):1346-1352.

"He 2010": He H, Wang J, Li K, Wang J, Gu J. Mixed resin and carbon fibres surface treatment for preparation of carbon fibres composites with good interfacial bonding strength. Materials & Design 2010; 31(10):4631-4637.

"Huang 1996": Huang Y, Young R J. Interfacial micromechanics in thermoplastic and thermosetting matrix carbon fibre composites. Composites Part A: Applied Science and Manufacturing 1996; 27(10):973-980.

"Kotaki 2009": Kotaki M, Wang K, Toh M L, Chen L, Wong S Y, He C. Electrically Conductive Epoxy/Clay/Vapor Grown Carbon Fiber Hybrids. Macromolecules 2009; 39(3):908-911.

"Li 2008": Li J. Interfacial studies on the O3 modified carbon fiber-reinforced polyamide 6 composites. Applied Surface Science 2008; 255(5, Part 2):2822-2824.

"Loctite Epoxy": Loctite® Instant Mix™ 5 minute epoxy. Henkel Corporation. 2012 (Apr. 18).

"Ma 2009": Ma W, Liu L, Zhang Z, Yang R, Liu G, Zhang T, An X, Yi X, Ren Y, Niu Z, Li J, Dong H, Zhou W, Ajayan P M, Xie S. High-Strength Composite Fibers: Realizing True Potential of Carbon Nanotubes in Polymer Matrix through Continuous Reticulate Architecture and Molecular Level Couplings. Nano Letters 2009; 9(8): 2855-2861.

"Manoharan 2009": Manoharan M P, Sharma A, Desai A V, Haque M A, Bakis C E, Wang K W. The interfacial strength of carbon nanofiber epoxy composite using single fiber pullout experiments. Nanotechnology 2009; 20(29):295701.

"Matrimid 5292A": Matrimid® 5292 A, Huntsman International LLC. 2012 (Apr. 13).

"Mei 2010": Mei L, He X, Li Y, Wang R, Wang C, Peng Q. Grafting carbon nanotubes onto carbon fiber by use of dendrimers. Materials Letters 2010; 64(22):2505-2508.

"Moon 1992": Moon C K, LEE J, Cho H H, Kim K S. Effect of diameter and surface treatment of fiber on interfacial shear strength in glass fiber/epoxy and HDPE. Journal of Applied Polymer Science 1992; 45(3):443-450.

"Özden-Yenigün 2012": Özden-Yenigün E, Menceloğlu Y Z, Papila M. MWCNTs/P(St-co-GMA) Composite Nanofibers of Engineered Interface Chemistry for Epoxy Matrix Nanocomposites. ACS Applied Materials & Interfaces 2012; 4(2):777-784.

"Qian 2010 I": Qian H, Bismarck A, Greenhalgh E S, Shaffer M S P. Carbon nanotube grafted carbon fibres: A study of wetting and fibre fragmentation. Composites Part A: Applied Science and Manufacturing 2010; 41(9):1107-1114.

"Quin 2010 II": Qian H, Bismarck A, Greenhalgh E S, Shaffer M S P. Carbon nanotube grafted silica fibres: Characterising the interface at the single fibre level. Composites Science and Technology 2010; 70(2):393-399.

"Rubi 2011": Rubi Y M, Ashrafi B, Guan J, Kingston C, Johnston A, Simard B, Mirjalili V, Hubert P, Deng L, Young R J. Toughening of Epoxy Matrices with Reduced Single-Walled Carbon Nanotubes. ACS Applied Materials & Interfaces 2011; 3(7):2309-2317.

"Sager 2009": Sager R J, Klein P J, Lagoudas D C, Zhang Q, Liu J, Dai L, Baur J W. Effect of carbon nanotubes on the interfacial shear strength of T650 carbon fiber in an epoxy matrix. Composites Science and Technology 2009; 69(7-8):898-904.

"Sharma 2011": Sharma S P, Lakkad S C. Effect of CNTs growth on carbon fibers on the tensile strength of CNTs grown carbon fiber-reinforced polymer matrix composites. Composites Part A: Applied Science and Manufacturing 2011; 42(1):8-15.

"Sui 2009": Sui X, Wagner H D. Tough Nanocomposites: The Role of Carbon Nanotube Type. Nano Letters 2009; 9(4):1423-1426.

"Swadener 1999": Swadener J G, Liechti K M, Lozanne Ald. The intrinsic toughness and adhesion mechanisms of a glass/epoxy interface. Journal of the Mechanics and Physics of Solids 1999; 47(2):223-258.

"Tezcan 2008": Tezcan J, Ozcan S, Gurung B, Filip P. Measurement and analytical validation of interfacial bond strength of PAN-fiber-reinforced carbon matrix composites. Journal of Materials Science 2008; 43(5):1612-1618.

"Thostenson 2002": Thostenson E T, Li W Z, Wang D Z, Ren Z F, Chou T W. Carbon nanotube/carbon fiber hybrid multiscale composites. Journal of Applied Physics 2002; 91(9):6034-6037.

"Tseng 2007": Tseng C H, Wang C C, Chen C Y. Functionalizing Carbon Nanotubes by Plasma Modification for the Preparation of Covalent-Integrated Epoxy Composites. Chemistry of Materials 2007: 19(2):308-315.

"Tsotsis 2009": Tsotsis T K. Interlayer toughening of composite materials. Polymer Composites 2009; 30(1):70-86.

"Ureña 2005": Ureña A, Rams J, Escalera M D, Sánchez M. Characterization of interfacial mechanical properties in carbon fiber/aluminium matrix composites by the nanoindentation technique. Composites Science and Technology 2005; 65(13):2025-2038.

"Zeng 2010": Zeng Y, Ci C, B. J., Vajtai R, Ajayan P M. Design and Reinforcement: Vertically Aligned Carbon Nanotube-Based Sandwich Composites. ACS Nano 2010; 4(11):6798-6804.

"F Zhang 2009": Zhang F, Wang R, He X, Wang C, Ren L. Interfacial shearing strength and reinforcing mechanisms of an epoxy composite reinforced using a carbon nanotube/carbon fiber hybrid. Journal of Materials Science 2009; 44(13):3574-3577.

"Zhang 2005": Zhang M, Fang S, Zakhidov A A, Lee S B, Aliev A E, Williams C D, Atkinson K R, Baughman R H. Strong, Transparent, Multifunctional, Carbon Nanotube Sheets. Science 2005; 309(5738):1215-1219.

"Q Zhang 2009": Zhang Q, Liu J, Sager R, Dai L, Baur J. Hierarchical composites of carbon nanotubes on carbon fiber: Influence of growth condition on fiber tensile properties. Composites Science and Technology 2009; 69(5): 594-601.

"Zhao 2010": Zhao F, Huang Y. Improved interfacial properties of carbon fiber/epoxy composites through grafting polyhedral oligomeric silsesquioxane on carbon fiber surface. Materials Letters 2010; 64(24):2742-2744.

"Zhong 2003": Zhong W, Pan N. A Computer Simulation of Single Fiber Pull Out Process in a Composite. Journal of Composite Materials 2003; 37(21):1951-1969.

"Zhu 2003": Zhu J, Kim J D, Peng H, Margrave J L, Khabashesku V N, Barrera E V. Improving the Dispersion and Integration of Single-Walled Carbon Nanotubes in Epoxy Composites through Functionalization. Nano Letters 2003; 3(8):1107-1113.

"Zhu 2007": Zhu J, Imam A, Crane R, Lozano K, Khabashesku V N, Barrera E V. Processing a glass fiber reinforced vinyl ester composite with nanotube enhancement of interlaminar shear strength. Composites Science and Technology 2007; 67(7-8):1509-1517.

"Zhu 2012": Zhu Y, Bakis C E, Adair J H. Effects of carbon nanofiller functionalization and distribution on interlaminar fracture toughness of multi-scale reinforced polymer composites. Carbon 2012; 50(3):1316-1331.

"Zu 2012": Zu M, Li Q, Zhu Y, Dey M, Wang G, Lu W, Deitzel J M, Gillespie Jr. J W, Byun J, Chou T. The effective interfacial shear strength of carbon nanotube fibers in an epoxy matrix characterized by a microdroplet test. Carbon 2012; 50(3):1271-1279.

"Schoeppner 2007": Schoeppner G A, Tandon G P, Ripberger E R. Anisotropic oxidation and weight loss in PMR-15 composites. Composites Part A: Applied Science and Manufacturing 2007; 38(3):890-904.

What is claimed is:

1. A method comprising:
   (a) selecting a fiber material selected from the group consisting of fibers and fiber tows;
   (b) helically wrapping nanofibers or nanofiber bundles from a first nanofiber sheet about the fiber material to provide nanofiber-scrolled fibers, wherein
      (i) the first nanofiber sheet comprises a first nanotube sheet, and
      (ii) the step of helically wrapping wraps the individual wrapping nanofibers or individual nanofiber bundles more than one complete turn about the fiber material; and
   (c) embedding the nanofiber-scrolled fibers in a polymer matrix to form a polymer composite that is reinforced by nanofiber-scrolled fibers.

2. The method of claim 1, wherein the helically wrapping is performed at a first wrapping angle between 0° to 90°.

3. The method of claim 1, wherein the helically wrapping is performed at a first wrapping angle between 0° to 30°.

4. The method of claim 1, wherein the fiber material is selected from the group consisting of carbon fiber, graphite fiber, glass fiber, natural polymer fiber, synthetic polymer fiber, metallic fiber, silicon carbide fiber, poly-paraphenylene terephthalamide fiber, and combinations thereof.

5. The method of claim 1, wherein the first nanofiber sheet comprises a first carbon nanotube sheet.

6. The method of claim 1, wherein the first nanofiber sheet comprises carbon nanotubes selected from the group consisting of single walled carbon nanotubes, double walled carbon nanotubes, multi-walled carbon nanotubes, and combinations thereof.

7. The method of claim 1 further comprising helically wrapping a second nanotube sheet about the fiber material, wherein
   (i) the helically wrapping of the first nanotube sheet is performed at a first wrapping angle between 0° to 90°,
   (ii) the helically wrapping of the second nanotube sheet is performed at a second wrapping angle between 0° to 90°, and
   (iii) the first wrapping angle and the second wrapping angle are different angles.

8. The method of claim 1 further comprising helically wrapping a plurality of nanofiber sheets about material, wherein the helically wrapping of the nanofiber sheets in the plurality of nanofiber sheets is performed at different wrapping angles between 0° to 90°.

9. The method of claim 1, wherein the nanofiber-scrolled-fiber reinforced polymer composite has a stiffness and a yield strength that are significantly increased as compared to the stiffness and yield strength of a fiber reinforced polymer composite comprising the fiber material embedded in the polymer composite in which the fiber material has not been treated with the step of helically wrapping.

10. The method of claim 9, wherein the nanofiber-scrolled-fiber reinforced polymer composite is more resistant to micro-buckling as compared to a fiber reinforced polymer composite comprising the fiber material embedded in the polymer composite in which the fiber material has not been treated with the step of helically wrapping.

11. The method of claim 1, wherein the nanofiber-scrolled-fiber reinforced polymer composite has an interfacial shear strength that is significantly increased as compared to the interfacial shear strength of a fiber reinforced polymer composite comprising the fiber material embedded in the polymer composite in which the fiber material has not been treated with the step of helically wrapping.

12. The method of claim 1, wherein the nanofiber-scrolled-fiber reinforced polymer composite has a compressive strength and a yield strength that are significantly increased as compared to the compressive strength and the yield strength of a fiber reinforced polymer composite comprising the fiber material embedded in the polymer composite in which the fiber material has not been treated with the step of helically wrapping.

13. The method of claim 1, wherein the nanofiber-scrolled-fiber reinforced polymer composite has a toughness and a stiffness that are significantly increased as compared to the toughness and the stiffness of a fiber reinforced polymer composite comprising the fiber material embedded in the polymer composite in which the fiber material has not been treated with the step of helically wrapping.

14. The method of claim 1, wherein the nanofiber-scrolled-fiber reinforced polymer composite has an interfacial shear strength, compressive strength, and toughness that are each at least 80% greater than the interfacial shear strength, the compressive strength, and the toughness of a fiber reinforced polymer composite comprising the fiber material embedded in the polymer composite in which the fiber material has not been treated with the step of helically wrapping.

15. The method of claim 1, wherein the polymer is a thermoplastic or thermoset polymer.

16. A nanofiber-scrolled-fiber reinforced polymer composite comprising:
   (a) a fiber material selected from the group consisting of fibers and fiber tows;
   (b) helically wrapped nanofibers or nanofiber bundles about the fiber material, wherein
      (i) the nanofibers or nanofiber bundles are nanotubes or nanotube bundles in a first nanotube sheet, and
      (ii) the individual nanofibers or the individual nanofiber bundles are helically wrapped about the fiber material more than one complete turn; and
   (c) a polymer matrix embedding the fiber material and the helically wrapped nanofibers or nanofiber bundles.

17. The nanofiber-scrolled-fiber reinforced polymer composite of claim 16, wherein the first nanotube sheet is helically wrapped about the fiber material at a first wrapping angle between 0° to 90°.

18. The nanofiber-scrolled-fiber reinforced polymer composite of claim 16, wherein the first nanotube sheet is helically wrapped about the fiber material at a first wrapping angle between 0° to 30°.

19. The nanofiber-scrolled-fiber reinforced polymer composite of claim 16, wherein the fiber material is selected from the group consisting of carbon fiber, graphite fiber, glass fiber, natural polymer fiber, synthetic polymer fiber, metallic fiber, silicon carbide fiber, poly-paraphenylene terephthalamide fiber, and combinations thereof.

20. The nanofiber-scrolled-fiber reinforced polymer composite of claim 16, wherein the first nanotube sheet comprises a carbon nanotube sheet.

21. The nanofiber-scrolled-fiber reinforced polymer composite of claim 16, wherein the first nanotube sheet comprises carbon nanotubes selected from the group consisting of single walled carbon nanotubes, double walled carbon nanotubes, multi-walled carbon nanotubes, and combinations thereof.

22. The nanofiber-scrolled-fiber reinforced polymer composite of claim 16 further comprising a second nanotube sheet helically wrapped about the fiber material, wherein
   (i) the first nanotube sheet is helically wrapped at a first wrapping angle between 0° to 90°,
   (ii) the second nanotube sheet is helically wrapped at a first wrapping angle between 0° to 90°, and
   (iii) the first wrapping angle and the second wrapping angle are different angles.

23. The nanofiber-scrolled-fiber reinforced polymer composite of claim 16 further comprises a plurality of nanotube sheets helically wrapped about the fiber material, wherein the nanotube sheets in the plurality of nanotube sheets are helically wrapped about the fiber material at different wrapping angles between 0° to 90°.

24. The nanofiber-scrolled-fiber reinforced polymer composite of claim 16, wherein the nanofiber-scrolled-fiber reinforced polymer composite has a stiffness and a yield strength that are significantly increased as compared to the stiffness and yield strength of a fiber reinforced polymer composite comprising the fiber material embedded in the polymer composite without the helically wrapped individual nanofibers or the individual nanofiber bundles.

25. The nanofiber-scrolled-fiber reinforced polymer composite of claim 24, wherein the nanofiber-scrolled-fiber reinforced polymer composite is more resistant to microbuckling as compared to a fiber reinforced polymer composite comprising the fiber material embedded in the polymer composite without the helically wrapped individual nanofibers or the individual nanofiber bundles.

26. The nanofiber-scrolled-fiber reinforced polymer composite of claim 16, wherein the nanofiber-scrolled-fiber reinforced polymer composite has an interfacial shear strength that is significantly increased as compared to the interfacial shear strength of a fiber reinforced polymer composite comprising the fiber material embedded in the polymer composite without the helically wrapped individual nanofibers or the individual nanofiber bundles.

27. The nanofiber-scrolled-fiber reinforced polymer composite of claim 16, wherein the nanofiber-scrolled-fiber reinforced polymer composite has a compressive strength and a yield strength that are significantly increased as compared to the compressive strength and the yield strength of a fiber reinforced polymer composite comprising the fiber material embedded in the polymer composite without the helically wrapped individual nanofibers or the individual nanofiber bundles.

28. The nanofiber-scrolled-fiber reinforced polymer composite of claim 16, wherein the nanofiber-scrolled-fiber reinforced polymer composite has a toughness and a stiffness that are significantly increased as compared to the toughness and the stiffness of a fiber reinforced polymer composite comprising the fiber material embedded in the polymer composite without the helically wrapped individual nanofibers or the individual nanofiber bundles.

29. The nanofiber-scrolled-fiber reinforced polymer composite of claim 16, wherein the nanofiber-scrolled-fiber reinforced polymer composite has an interfacial shear strength, compressive strength, and toughness that are each at least 80% greater than the interfacial shear strength, the compressive strength, and the toughness of a fiber reinforced polymer composite comprising the fiber material embedded in the polymer composite without the helically wrapped individual nanofibers or the individual nanofiber bundles.

30. The nanofiber-scrolled-fiber reinforced polymer composite of claim 16, wherein the polymer is a thermoplastic or thermoset polymer.

\* \* \* \* \*